US012767815B2

(12) United States Patent
Nagatomo et al.

(10) Patent No.: US 12,767,815 B2
(45) Date of Patent: Oct. 20, 2026

(54) RESIN PARTICLES, METHOD OF PRODUCING RESIN PARTICLES, TONER, TONER STORAGE UNIT, AND IMAGE FORMING APPARATUS

(71) Applicants: Tsuneyasu Nagatomo, Shizuoka (JP); Junichi Watanabe, Shizuoka (JP); Yuka Mizoguchi, Shizuoka (JP); Kohsuke Satoh, Shizuoka (JP)

(72) Inventors: Tsuneyasu Nagatomo, Shizuoka (JP); Junichi Watanabe, Shizuoka (JP); Yuka Mizoguchi, Shizuoka (JP); Kohsuke Satoh, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 717 days.

(21) Appl. No.: 18/177,412

(22) Filed: Mar. 2, 2023

(65) Prior Publication Data

US 2023/0279222 A1 Sep. 7, 2023

(30) Foreign Application Priority Data

Mar. 7, 2022 (JP) ................................ 2022-034242

(51) Int. Cl.

| | |
|---|---|
| ***C08L 67/03*** | (2006.01) |
| ***C08G 63/127*** | (2006.01) |
| ***C08G 63/183*** | (2006.01) |
| ***C08J 3/12*** | (2006.01) |
| ***C08L 67/00*** | (2006.01) |
| ***C08L 67/02*** | (2006.01) |
| ***G03G 9/087*** | (2006.01) |
| ***G03G 9/093*** | (2006.01) |

(52) U.S. Cl.

CPC ............ *C08L 67/03* (2013.01); *C08G 63/127* (2013.01); *C08G 63/183* (2013.01); *C08J 3/126* (2013.01); *C08L 67/00* (2013.01); *C08L 67/02* (2013.01); *G03G 9/08755* (2013.01); *G03G 9/09328* (2013.01); *G03G 9/09371* (2013.01); *G03G 9/09392* (2013.01); *C08J 2367/03* (2013.01); *C08J 2391/06* (2013.01); *C08J 2467/03* (2013.01); *C08L 2207/53* (2013.01)

(58) Field of Classification Search

CPC ...... C08L 67/03; C08L 2207/53; C08L 67/00; C08G 63/183; C08G 63/127; C08J 3/126; C08J 2367/03; C08J 2391/06; C08J 2467/03; G03G 9/08755; G03G 9/09392; G03G 9/09328; G03G 9/09371

See application file for complete search history.

(56) References Cited

U.S. PATENT DOCUMENTS

| | | | | |
|---|---|---|---|---|
| 5,290,654 | A * | 3/1994 | Sacripante | C08J 3/215 523/322 |
| 9,410,037 | B2 * | 8/2016 | Li | G03G 9/0806 |
| 9,971,265 | B1 * | 5/2018 | Sacripante | G03G 9/09328 |
| 2005/0245694 | A1 * | 11/2005 | Matsumura | C08L 67/02 525/437 |
| 2006/0063081 | A1 | 3/2006 | Nagatomo et al. | |
| 2007/0218383 | A1 | 9/2007 | Seshita et al. | |
| 2007/0218385 | A1 | 9/2007 | Kojima et al. | |
| 2007/0218387 | A1 | 9/2007 | Ishii et al. | |
| 2007/0275315 | A1 | 11/2007 | Nagatomo et al. | |
| 2008/0069616 | A1 | 3/2008 | Kojima et al. | |
| 2008/0070144 | A1 | 3/2008 | Nagatomo et al. | |
| 2008/0227015 | A1 | 9/2008 | Nagatomo et al. | |
| 2008/0233505 | A1 | 9/2008 | Nagatomo et al. | |
| 2009/0067876 | A1 | 3/2009 | Seshita et al. | |
| 2009/0142093 | A1 | 6/2009 | Sawada et al. | |
| 2009/0142094 | A1 | 6/2009 | Sawada et al. | |
| 2009/0142685 | A1 | 6/2009 | Nagatomo et al. | |
| 2009/0142686 | A1 | 6/2009 | Kojima et al. | |
| 2010/0075243 | A1 | 3/2010 | Shimota et al. | |
| 2010/0075245 | A1 | 3/2010 | Watanabe et al. | |
| 2010/0081075 | A1 | 4/2010 | Watanabe et al. | |
| 2010/0119255 | A1 | 5/2010 | Seshita et al. | |
| 2010/0310980 | A1 | 12/2010 | Sugimoto et al. | |
| 2010/0316948 | A1 | 12/2010 | Sakaguchi et al. | |
| 2011/0033794 | A1 | 2/2011 | Watanabe et al. | |
| 2011/0097659 | A1 | 4/2011 | Sugiura et al. | |
| 2011/0136052 | A1 | 6/2011 | Watanabe et al. | |
| 2011/0151372 | A1 | 6/2011 | Watanabe et al. | |

(Continued)

FOREIGN PATENT DOCUMENTS

| | | |
|---|---|---|
| JP | 4050051 | 2/2008 |
| JP | 2012-145649 | 8/2012 |

(Continued)

OTHER PUBLICATIONS

Xerox Docucolor700 User Guide (Year: 2009).*

(Continued)

*Primary Examiner* — Marc S Zimmer

*Assistant Examiner* — Virginia L Stonehocker

(74) *Attorney, Agent, or Firm* — Grüneberg Global IP, PLLC

(57) ABSTRACT

Resin particles include a binder resin in each of the resin particles. The binder resin includes a biomass-derived resin, and polyethylene terephthalate or polybutylene terephthalate. An amount A of a biomass-derived component of the biomass-derived resin and an amount B of the polyethylene terephthalate or the polybutylene terephthalate satisfy A>B. Each of the resin particles has a core-shell structure including a shell layer and a core layer. An average thickness of the shell layer is from 100 nm to 500 nm.

11 Claims, 5 Drawing Sheets

(56) References Cited

U.S. PATENT DOCUMENTS

| | | | | |
|---|---|---|---|---|
| 2011/0200928 | A1 | 8/2011 | Watanabe et al. | |
| 2011/0281209 | A1 | 11/2011 | Sugiura et al. | |
| 2011/0294058 | A1 | 12/2011 | Shiba et al. | |
| 2011/0294064 | A1 | 12/2011 | Miyaake et al. | |
| 2012/0021347 | A1 | 1/2012 | Shimota et al. | |
| 2012/0070774 | A1 | 3/2012 | Satoh et al. | |
| 2012/0219894 | A1* | 8/2012 | Farrugia .............. | G03G 9/0819 430/109.4 |
| 2013/0059249 | A1 | 3/2013 | Watanabe et al. | |
| 2013/0130171 | A1 | 5/2013 | Watanabe et al. | |
| 2013/0216944 | A1 | 8/2013 | Shiba et al. | |
| 2013/0224648 | A1 | 8/2013 | Honda et al. | |
| 2013/0236828 | A1 | 9/2013 | Mizoguchi et al. | |
| 2013/0243488 | A1 | 9/2013 | Kojima et al. | |
| 2013/0244155 | A1 | 9/2013 | Satoh et al. | |
| 2013/0244156 | A1 | 9/2013 | Kojima et al. | |
| 2013/0244158 | A1 | 9/2013 | Awamura et al. | |
| 2013/0244169 | A1 | 9/2013 | Miyaake et al. | |
| 2014/0072349 | A1 | 3/2014 | Sakashita et al. | |
| 2014/0134534 | A1 | 5/2014 | Sacripante et al. | |
| 2014/0140731 | A1 | 5/2014 | Hozumi et al. | |
| 2014/0220485 | A1 | 8/2014 | Kojima et al. | |
| 2014/0234767 | A1 | 8/2014 | Awamura et al. | |
| 2014/0270874 | A1 | 9/2014 | Hase et al. | |
| 2014/0348546 | A1 | 11/2014 | Kojima et al. | |
| 2015/0072277 | A1 | 3/2015 | Sugiura et al. | |
| 2015/0072278 | A1 | 3/2015 | Mizoguchi et al. | |
| 2015/0104739 | A1 | 4/2015 | Nagatomo et al. | |
| 2015/0378272 | A1 | 12/2015 | Hase et al. | |
| 2016/0070191 | A1 | 3/2016 | Kumai et al. | |
| 2016/0266507 | A1 | 9/2016 | Watanabe et al. | |
| 2016/0334722 | A1 | 11/2016 | Makabe et al. | |
| 2016/0349641 | A1* | 12/2016 | Sacripante ......... | G03G 9/08755 |
| 2017/0017175 | A1 | 1/2017 | Yamada et al. | |
| 2018/0181014 | A1 | 6/2018 | Makabe et al. | |
| 2018/0259865 | A1 | 9/2018 | Takeyama et al. | |
| 2018/0267417 | A1 | 9/2018 | Mizoguchi et al. | |
| 2018/0267420 | A1 | 9/2018 | Yamashita et al. | |
| 2018/0364600 | A1 | 12/2018 | Fuwa et al. | |
| 2019/0235405 | A1 | 8/2019 | Masuda et al. | |
| 2020/0089140 | A1 | 3/2020 | Viasuda et al. | |
| 2020/0103775 | A1 | 4/2020 | Kitagawa et al. | |
| 2020/0272066 | A1 | 8/2020 | Satoh et al. | |
| 2020/0285167 | A1 | 9/2020 | Mizoguchi et al. | |
| 2020/0301298 | A1 | 9/2020 | Inoue et al. | |
| 2020/0301308 | A1 | 9/2020 | Makabe et al. | |
| 2021/0116830 | A1 | 4/2021 | Takei et al. | |
| 2021/0124281 | A1 | 4/2021 | Sugiyama et al. | |
| 2022/0057726 | A1 | 2/2022 | Mizoguchi et al. | |
| 2022/0197165 | A1 | 6/2022 | Harashima et al. | |
| 2022/0342332 | A1 | 10/2022 | Sugiyama et al. | |
| 2023/0026448 | A1 | 1/2023 | Yamashita et al. | |

FOREIGN PATENT DOCUMENTS

| | | |
|---|---|---|
| JP | 6138021 | 5/2017 |
| JP | 2022-151547 | 10/2022 |
| WO | WO2022/202135 A1 | 9/2022 |

OTHER PUBLICATIONS

U.S. Appl. No. 18/079,050, filed Dec. 12, 2022.
U.S. Appl. No. 18/046,436, filed Oct. 13, 2022.
U.S. Appl. No. 18/070,507, filed Nov. 29, 2022.

* cited by examiner

RESIN PARTICLES, METHOD OF PRODUCING RESIN PARTICLES, TONER, TONER STORAGE UNIT, AND IMAGE FORMING APPARATUS

CROSS-REFERENCE TO RELATED APPLICATION

The present application claims priority under 35 U.S.C. § 119 to Japanese Patent Application No. 2022-034242, filed Mar. 7, 2022, the contents of which are incorporated herein by reference in their entirety.

BACKGROUND OF THE INVENTION

1. Field of the Invention

The disclosures herein generally relate to resin particles, a method of producing resin particles, a toner storage unit, and an image forming apparatus.

2. Description of the Related Art

There has been a demand for toners that are be more environmentally friendly. To meet this demand, for example, reduction in consumption electricity by improving low-temperature fixability of a toner itself, reduction in energy usage during production of toners, and use of a biomass (plant)-derived resin as a binder resin have been studied. Moreover, there has been increasing awareness that resource efficiency, energy saving, and recycling of resources are important because energy use has increased along with increasese in worldwide population, leading to lack of resources. Bottles formed of polyethylene terephthalate (PET) or polybutylene terephthalate (PBT) have been recycled by local governments, and the recycled PET or PBT has been used for various fabrics for clothing or various containers. Therefore, discovery of novel use of recycled PET or PBT has been strongly desired.

In the viewpoint as described, a binder resin for toners has been produced using recycled PET or PBT as a raw material, and a toner including such a binder resin (i.e. a recycle toner) is known in the art. For example, proposed is a toner resin including a bio-based polyester, a polyol including a depolymerized recycled plastic, an optional wax, and an optional colorant. The toner resin has a sustainability content of about 70%, where the sustainability content is content of components that are bio-based and reused from a prior and other purpose product, and recycled for use in the toner (see Japanese Patent No. 6138021).

SUMMARY OF THE INVENTION

In one embodiment, resin particles include a binder resin in each of the resin particles. The binder resin includes a biomass-derived resin, and polyethylene terephthalate or polybutylene terephthalate. An amount A of a biomass-derived component of the biomass-derived resin and an amount B of the polyethylene terephthalate or the polybutylene terephthalate satisfy A>B. Each of the resin particles has a core-shell structure including a shell layer and a core layer. An average thickness of the shell layer is from 100 nm to 500 nm.

DESCRIPTION OF THE PREFERRED EMBODIMENTS

Figure 1:
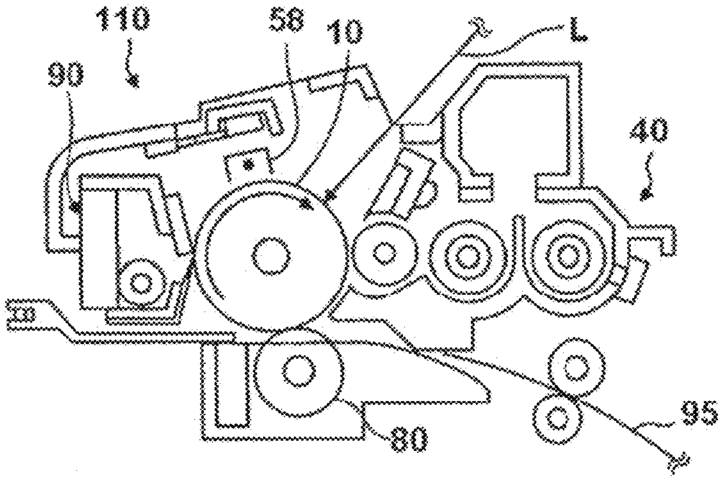
FIG. 1 is a schematic view illustrating an example of a process cartridge serving as the toner storage unit of the present disclosure.

In the following, embodiments of the present invention will be described with reference to the accompanying drawings.

Further, the present invention is not limited to these embodiments, but various variations and modifications may be made without departing from the scope of the present invention.

(Resin Particles)

The resin particles of the present disclosure include at least a binder resin in each of the resin particles, and may further include other components as necessary.

The binder resin includes a biomass-derived resin, and polyethylene terephthalate or polybutylene terephthalate. An amount A of a biomass-derived component of the biomass-derived resin and an amount B of the polyethylene terephthalate or the polybutylene terephthalate satisfy A>B.

Moreover, each of the resin particles has a core-shell structure including a shell layer and a core layer (may be also referred to as a "core"). An average thickness of the shell layer is from 100 nm to 500 nm.

An object of the present disclosure is to provide resin particles that are environmentally friendly, and achieve excellent low-temperature fixability and filming resistance even when a biomass-derived resin is used in the resin particles.

The present disclosure can provide resin particles that are environmentally friendly, and achieve excellent low-temperature fixability and filming resistance even when a biomass-derived resin is used in the resin particles.

In the present specification, the "shell layer" means a layer that is disposed as an outermost layer of each resin particle. The "core layer" means a region within each resin particle excluding the shell layer. The "core-shell structure" means a structure mainly made up of the core layer and the shell layer.

The core layer and the shell layer are not completely compatible inside each resin particle, and are not homogeneously distributed.

As a preferable embodiment of the core-shell structure, the core-shell structure is a structure where a surface of the core layer is covered with the shell layer.

In the core-shell structure, the surface of the core layer may be completely covered with the shell layer, or may not be completely covered with the shell layer. Examples of the embodiment of the resin particles where the surface of the core layer is not completely covered with the shell layer include: an embodiment where a core layer is covered with a net-like shell layer; and an embodiment where a core layer is partially exposed from a shell layer. Among the above-listed examples, the surface of the core layer is preferably completely covered with the shell layer considering filming resistance.

There has been a strong demand for a toner that includes a biomass-derived resin and that can improve a function as a toner as well as enhancing environmental friendliness. If an attempt is made to increase a biomass degree of a toner with a constituent component other than a release agent, such as a binder resin, however, an absolute value ΔSP of a difference between a solubility parameter of the amorphous polyester resin and a solubility parameter of the crystalline resin increases. Therefore, compatibility between the amorphous polyester resin and the crystalline resin decreases, impairing low-temperature fixability. Most of petroleum-based resins include a constituent monomer having an aromatic ring skeleton, thus a petroleum-based resin easily imparts mechanical strength to a resulting product. However, a constituent monomer of the biomass-derived resin does not have an aromatic ring skeleton, thus it is difficult to achieve desired mechanical strength using the biomass-derived resin. If the resin particles using the biomass-derived resin are used as a toner, filming may occur on a photoconductor. Therefore, it is difficult to improve environmental friendliness using a recycled resource at the same time as achieving desired characteristics as a toner, such as low-temperature fixability and filming resistance.

To solve the above-described problems, the present inventors have diligently conducted a research and have acquired the following insights. A mechanical strength of resin particles can be enhanced with a biomass-derived resin when the biomass-derived resin is added to the resin particles, and polyethylene terephthalate (PET) or polybutylene terephthalate (PBT) having an aromatic ring skeleton is added to a binder resin. Therefore, such resin particles can be made environmentally friendly, as well as having excellent mechanical strength. The excellent mechanical strength of the resin particles leads to excellent filming resistance. Therefore, the resin particles of the present disclosure having both environmental friendliness and excellent qualities for use as a toner are achieved.

The resin particles of the present disclosure will be described hereinafter. The present disclosure is not limited to embodiments described below, various modifications, such as substituting with another embodiment, adding, changing, and omitting, may be made without departing from the scope of the present invention, provided that the embodiments achieve functions and effects of the present disclosure.

<<Radiocarbon $^{14}C$ Content>>

A radiocarbon $^{14}C$ content (may be referred to as a "$^{14}C$ content" hereinafter) of the resin particles is not particularly limited, and may be appropriately selected in accordance with the intended purpose. The radiocarbon $^{14}C$ content is preferably 10.8 pMC or greater, more preferably 20.0 pMC or greater, and yet more preferably 30.0 pMC or greater. When the radiocarbon $^{14}C$ content of the resin particles is 10.8 pMC or greater, the resin particles are generally recognized as having a high biomass degree, which will be described later, and can reduce an adverse impact to the environment.

The $^{14}C$ is present in nature (the atmosphere) and living plants incorporate $^{14}C$ through photosynthesis so that a $^{14}C$ content of the plant and a $^{14}C$ content of the atmosphere are equivalent (107.5 pMC). When plants die, intake of $^{14}C$ through photosynthesis also ceases, and the $^{14}C$ content of the plant decreases at a decay rate according to a half-life of the $^{14}C$ that is 5,730 years. The $^{14}C$ is barely detected in any fossil fuels formed from living organisms because tens of thousands of years to hundreds of millions of years have been passed since the termination of living activities.

In the present specification, "pMC" is an abbreviation of percent Modern Carbon, and is determined by setting a ratio ($^{14}C/^{12}C$) as 100 pMC, where the ratio ($^{14}C/^{12}C$) is a ratio of $^{14}C$ in biomass of 1950 AD to $^{12}C$ in biomass of 1950 AD. However, the $^{14}C$ content of the atmosphere has been increasing year by year. Therefore, it is specified that a value of pMC is to be corrected by multiplying with a coefficient. As the correction coefficient, a coefficient corresponding to each specific year is used.

The $^{14}C$ content may be also expressed as a biomass degree that is calculated according to Formula (1) below.

$$\text{Biomass degree (\%)} = {}^{14}C \text{ content } (pMC)/107.5 \times 100 \quad \text{[Formula (1)]}$$

The $^{14}C$ content being 10.8 pMC or greater means that the biomass degree is 10% or greater, and is a desirable $^{14}C$ content considering carbon neutrality.

Plant-derived wax may be used for a toner. However, inclusion of the wax in the resin particles alone cannot achieve the desirable $^{14}C$ content in the resin particles, 10.8 pMC or greater, i.e., the biomass degree of 10% or greater. Therefore, use of biomass in a binder resin is also important to consider, which leads to the present disclosure.

A method of measuring the $^{14}C$ content is not particularly limited, and may be appropriately selected in accordance with the intended purpose. A particularly preferred measuring method is radiocarbon dating.

As a measuring method of the radiocarbon dating, the resin particles are combusted, and carbon dioxide ($CO_2$) of the resin particles is reduced to obtain C (graphite). The $^{14}C$ content of the graphite is measured by means of an accelerator mass spectrometer (AMS). For example, the measurement by AMS is disclosed in Japanese Patent No. 4050051.

<Binder Resin>

The binder resin includes a biomass-derived resin, and polyethylene terephthalate or polybutylene terephthalate.

<<Polyethylene Terephthalate or Polybutylene Terephthalate>>

The polyethylene terephthalate (PET) or polybutylene terephthalate (PBT) is added mainly for improving mechanical strength, which leads to improvement in filming resistance. The PET or PBT is preferably included in the core layer of each of the resin particles.

The PET and PBT are both semi-aromatic polyesters formed through a reaction between an aromatic diacid and an aliphatic diol. Specifically, PET is a compound having an aromatic ring skeleton where the number of carbons derived from the aliphatic diol is 2 (C2). Moreover, PBT is a compound having an aromatic ring skeleton where the number of carbons derived from the aliphatic diol is 4 (C4). Since PET and PBT have similar chemical characteristics as described, it is common knowledge for a person skilled in the art that qualities and/or performance achievable by PET is also achievable by PBT in the technical fields of resin particles, toners, electrophotography, and so forth. In the resin particles of the present disclosure, PET and PBT also interchangeable. The aromatic ring skeletons of the PET and PBT are particularly effective for improving mechanical strength of the resin particles.

Among the above-listed examples, a compound, in which the number of carbon atoms derived from the aliphatic diol is small, is preferable for improving mechanical strength of resulting resin particles, and PET is particularly preferable.

The PET or PBT is not particularly limited, and may be appropriately selected in accordance with the intended purpose. For example, recycled products of the PET or PBT, fiber fragments of the PET or PBT from off-spec products, or pellets of the PET or PBT may be used. Considering environmental friendliness, a recycle product (may be referred to as a "recycled resin" hereinafter) processed into flakes is preferably used.

In the present specification, the biomass-derived resin and the recycled resin may be collectively referred to as an "environmentally friendly resin."

A molecular weight of the PET or PBT, a composition of the PET or PBT, a production method for the PET or PBT, and a form of the PET or PBT at the time of use are not particularly limited, and may be appropriately selected in accordance with the intended purpose.

A weight average molecular weight (Mw) of the PET or PBT is not particularly limited, and may be appropriately selected in accordance with the intended purpose. The weight average molecular weight (Mw) of the PET or PBT is preferably from 30,000 to 100,000.

An analysis method and calculation method of an amount of the PET or PBT in the resin particles are not particularly limited, and may be appropriately selected from methods known in the art. For example, components are separated from the resin particles by GPC etc., and each of the separated components may be analyzed by the below-described analysis method to calculate a mass ratio of each of the constituent components of the resin particles. Moreover, a quantitative analysis may be also performed in the following manner. A main constituent component is estimated from mild decomposition of an ester bond site of the resin structure through methylation by GC/MS at 300° C. with a reaction reagent (a 10% tetramethylammonium hydroxide (TMAH)/methanol solution), and a calibration curve of total ion current chromatogram (TICC) intensities is drawn to perform a quantitative analysis.

The below-described environmentally friendly resin ratio, and toner quality of the resin particles, when the resin particles are used for a toner, may be adjusted by adjusting a blending ratio of the PET or PBT during synthesis of the binder resin.

An amount B of the PET or PBT is not particularly limited, provided that an amount A of a biomass-derived component of the biomass-derived resin and the amount B of the PET or PBT satisfy A>B. The amount B of the PET or PBT may be appropriately selected in accordance with the intended purpose. The amount B of the PET or PBT relative to a total mass of the resin particles is preferably from 5% by mass to 50% by mass, and more preferably from 5% by mass to 20% by mass, considering environmental friendliness.

<<Biomass-Derived Resin>>

The biomass-derived resin is a resin including a plant-derived compound as a raw material. The biomass-derived resin is not particularly limited, and may be appropriately selected in accordance with the intended purpose. The biomass-derived resin may be included in a crystalline resin, or in an amorphous resin. The above-listed examples may be used alone or in combination. The biomass-derived resin is included in the core layer of each of the resin particles.

The below-described environmentally friendly resin ratio and a quality of the resin particles as a toner when the resin particles are used for a toner may be adjusted by adjusting a ratio between a petroleum-derived component and a plant-derived component (i.e., a biomass-derived component) for each of the alcohol component and acid component constituting the crystalline resin or amorphous resin of the resin particles.

An amount A of a biomass-derived component of the biomass-derived resin is not particularly limited, provided that the amount A of the biomass-derived component of the biomass-derived resin and an amount B of the polyethylene terephthalate or polybutylene terephthalate satisfy A>B. The amount A of the biomass-derived component of the biomass-derived resin may be appropriately selected in accordance with the intended purpose. Considering a reduction in an adverse impact to the environment, the amount A of the biomass-derived component of the biomass-derived resin relative to a total mass of the resin particles is preferably from 20% by mass to 70% by mass, and more preferably from 25% by mass to 35% by mass.

—Amount of Biomass-Derived Resin and Amount of PET or PBT—

The amount A of the biomass-derived component of the biomass-derived resin and the amount B of the PET or PBT satisfy A>B. In other words, the amount of the biomass-derived component of the biomass-derived resin is greater than the amount of the PET or PBT. When the relation between the amount A of the biomass-derived component of the biomass-derived resin and the amount B of the PET or PBT is A=B or A<B, desirable low-temperature fixability may not be achieved.

A sum [A+B] of the amount A of the biomass-derived component of the biomass-derived resin and the amount B of the PET or PBT relative to a total mass of the resin particles is not particularly limited, and may be appropriately selected in accordance with the intended purpose. Considering a reduction in an adverse impact to the environment, the sum [A+B] is preferably 10% by mass or greater, and more preferably 35% by mass or greater. An upper limit of the sum [A+B] of the amount A of the biomass-derived component of the biomass-derived resin and the amount B of the PET or PBT relative to a total mass of the resin particles is not particularly limited, and may be appropriately selected in accordance with the intended purpose. The upper limit is preferably 80% by mass or less.

When a recycled PET or PBT resin is used as the PET or PBT, the sum [A+B] of the amount A of the biomass-derived component of the biomass-derived resin and the amount B of the PET or PBT may be regarded as an amount of the environmentally friendly resin (may be also referred to as an "environmentally friendly resin ratio").

The environmentally friendly resin ratio (% by mass) is a value obtained by calculating according to Formula (2) below.

$$\text{Environmentally friendly resin ratio (\% by mass)} = \text{amount}(A) \text{ of biomass-derived component of biomass-derived resin} + \text{amount}(B) \text{ of } PET \text{ or } PBT = \text{biomass degree} + \text{amount}(B) \text{ of } PET \text{ or } PBT \quad \text{[Formula (2)]}$$

In Formula (2) above, the "biomass degree" is a value obtained by calculating according to Formula (1). When a composition of the biomass-derived resin and blending ratios of constituent components of the biomass-derived resin are known, the "biomass degree" may be calculated from amounts of constituent components of the biomass-derived resin.

<<<Crystalline Resin>>>

A crystalline resin is preferably added to the resin particles for improving low-temperature fixability. The crystalline resin is preferably included in the core layer of each of the resin particles. The crystalline resin preferably includes the biomass-derived resin considering environmental friendliness.

The crystalline resin is not particularly limited, provided that the crystalline resin has crystallinity. The crystalline resin may be appropriately selected in accordance with the intended purpose. Examples of the crystalline resin include a polyester resin, a polyurethane resin, a polyurea resin, a polyamide resin, a polyether resin, a vinyl resin, and a modified crystalline resin. The above-listed examples may be used alone or in combination. Among the above-listed examples, the crystalline resin is preferably a crystalline polyester resin.

—Crystalline Polyester Resin—

Since the crystalline polyester resin has high crystallinity, the crystalline polyester resin has thermal melting properties such that a viscosity of the crystalline polyester resin drastically changes at a temperature close to a fixing onset temperature.

Since the crystalline polyester resin having such properties is used in combination with an amorphous polyester resin, resin particles having both excellent heat-resistant storage stability and excellent low-temperature fixability are obtained. As the crystalline polyester resin and the amorphous polyester resin are used in combination, for example, resulting resin particles have excellent heat-resistant storage stability owing to the crystalline polyester resin until a temperature of the resin particles reaches just below the melt onset temperature. At the melt onset temperature, the resin particles cause a drastic reduction in viscosity (sharp melting) due to melt of the crystalline polyester resin. Since the melted crystalline polyester resin becomes compatible with the amorphous polyester resin B, the viscosity of the resin particles is drastically reduced, consequently improving fixability.

The crystalline polyester resin may be synthesized from a multivalent alcohol (polyol) and a multivalent carboxylic acid (polycarboxylic acid) or a derivative of the multivalent carboxylic acid. The above-listed examples may be used alone or in combination. When a plant-derived compound is used as the multivalent alcohol, or the multivalent carboxylic acid, or both, the crystalline polyester resin is formed as a biomass-derived resin.

The derivative of the multivalent carboxylic acid is not particularly limited, and may be appropriately selected in accordance with the intended purpose. Examples of the derivative of the multivalent carboxylic acid include a multivalent carboxylic acid anhydride and a multivalent carboxylic acid ester.

In the present specification, the crystalline polyester resin is a resin synthesized from the multivalent alcohol and the multivalent carboxylic acid or a derivative of the multivalent carboxylic acid. A modified polyester resin, such as a prepolymer and a resin obtained through a reaction of the prepolymer, i.e., a cross-linking reaction and/or an elongation reaction of the prepolymer, is not classified as the crystalline polyester resin.

——Multivalent Alcohol ——

The multivalent alcohol is not particularly limited, and may be appropriately selected in accordance with the intended purpose. Examples of the multivalent alcohol include diols and trivalent or higher alcohols.

Examples of the diols include saturated aliphatic diols.

Examples of the saturated aliphatic diols include a straight-chain saturated aliphatic diol and a branched-chain saturated aliphatic diol. Among the above-listed examples, the saturated aliphatic diol is preferably a straight-chain saturated aliphatic diol, and more preferably a C2-C12 straight-chain saturated aliphatic diol. Use of a straight-chain saturated aliphatic diol as the saturated aliphatic diol is preferable because a resulting crystalline polyester resin C has high crystallinity and a high melting point. When the number of carbon atoms of the saturated aliphatic diol is greater than 12, it is practically difficult to acquire such a saturated aliphatic diol.

Specific examples of the saturated aliphatic diols include ethylene glycol, 1,3-propanediol, 1,4-butanediol, 1,5-pentanedial, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. The above-listed examples may be used alone or in combination. Among the above-listed examples, ethylene glycol, 1,4-butanediol, 1,6-hexanediol, 1,8-octanediol, 1,9-nonanediol, 1,10-decanediol, and 1,12-dodecanediol are preferable because a resulting crystalline polyester resin has high crystallinity and excellent sharp melting properties.

Examples of the trivalent or higher alcohols include glycerin, trimethylolethane, trimethylolpropane, and pentaerythritol. The above-listed examples may be used alone or in combination.

——Multivalent Carboxylic Acid ——

The multivalent carboxylic acid is not particularly limited, and may be appropriately selected in accordance with the intended purpose. Examples of the multivalent carboxylic acid include a divalent carboxylic acid and a trivalent or higher carboxylic acid.

Examples of the divalent carboxylic acid include a saturated aliphatic dicarboxylic acid, an aromatic dicarboxylic acid, anhydrides of the foregoing divalent carboxylic acid, and lower (C1-C3) alkyl esters of the foregoing divalent carboxylic acids.

Examples of the saturated aliphatic dicarboxylic acid include oxalic acid, succinic acid, glutamic acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid.

Examples of the aromatic dicarboxylic acid include phthalic acid, isophthalic acid, terephthalic acid, naphthalene-2,6-dicarboxylic acid, malonic acid, and mesaconic acid.

The above-listed examples may be used alone or in combination. Among the above-listed examples, the multivalent carboxylic acid is preferably a plant-derived C12 or lower saturated aliphatic dicarboxylic acid, and more preferably a plant-derived C4-C12 saturated aliphatic dicarboxylic acid for achieving carbon neutrality.

Examples of the trivalent or higher carboxylic acid include 1,2,4-benzenetricarboxylic acid, 1,2,5-benzenetricarboxylic acid, 1,2,4-naphthalenetricarboxylic acid, anhydrides of the foregoing trivalent or higher carboxylic acids, and lower (C1-C3) alkyl esters of the foregoing trivalent or higher carboxylic acids. The above-listed examples may be used alone or in combination.

Among the above-listed examples, the crystalline polyester resin is preferably synthesized from a C4-C12 straight-chain saturated dicarboxylic acid and C2-C12 straight-chain saturated aliphatic diol because the resulting crystalline polyester resin has high crystallinity and excellent sharp melt properties, leading to excellent low-temperature fixability.

A method of controlling crystallinity and a softening point of the crystalline polyester resin is not particularly limited, and may be appropriately selected in accordance with the intended purpose. Examples of the method include a method where a trivalent or higher multivalent alcohol (e.g., glycerin) is added to an alcohol component, or a trivalent or higher multivalent carboxylic acid (e.g., trimellitic acid anhydride) is added to an acid component to perform condensation polymerization during synthesis of a polyester to produce a non-linear polyester, and the produced non-linear polyester is used.

A molecular structure of the crystalline resin can be confirmed by solution or solid nuclear magnetic resonance spectroscopy (NMR), X-ray diffraction spectroscopy, gas chromatography-mass spectrometry (GC-MS), liquid chromatography-mass spectrometry (LC-MS), or infrared (IR) spectroscopy. Among the above-listed measuring methods, a simple measuring method used may be a method where a compound having absorption, which is based on δCH (out of plane bending) of an olefin, at 965±10 cm-1 and 990±10 $cm^{-1}$ on an infrared absorption spectrum of the compound as measured by IR spectroscopy is detected as the crystalline resin.

A molecular weight of the crystalline resin is not particularly limited, and may be appropriately selected in accordance with the intended purpose. Since the crystalline resin having a sharp molecular weight distribution and a low molecular weight imparts excellent low-temperature fixability to resulting resin particles, and the crystalline resin including a large amount of a high molecular component imparts excellent heat-resistant storage stability, a peak position is preferably in the range of from 3.5 to 4.0, a half-value width of the peak is preferably 1.5 or less, and a molecular weight is in the following range as measured on a molecular weight distribution spectrum obtained by gel permeation chromatography (GPC) of an o-dichlorobenzene-soluble component where a log (M) is plotted on a horizontal axis, and % by weight is plotted on a vertical axis.

A weight average molecular weight (Mw) of the crystalline resin is preferably from 3,000 to 30,000, and more preferably from 5,000 to 15,000.

A number average molecular weight (Mn) of the crystalline resin is preferably from 1,000 to 10,000, and more preferably from 2,000 to 10,000.

A ratio (Mw/Mn) of the molecular weights of the crystalline resin is preferably from 1 to 10, and more preferably from 1 to 5.

An acid value of the crystalline resin is not particularly limited, and may be appropriately selected in accordance with the intended purpose. A lower limit of the acid value is preferably 5 mgKOH/g or greater for improving affinity between a recording medium and resulting resin particles to achieve desirable low-temperature fixability, and more preferably 7 mgKOH/g or greater in view of production of resin particles through phase inversion emulsification. Moreover, an upper limit of the acid value of the crystalline resin is preferably 45 mgKOH/g or less for improving hot-offset resistance.

The acid value of the crystalline resin can be measured according to the measuring method disclosed in JIS K0070-1992.

A hydroxyl value of the crystalline resin is not particularly limited, and may be appropriately selected in accordance with the intended purpose. The hydroxyl value of the crystalline resin is preferably from 0 mgKOH/g to 50 mgKOH/g, and more preferably from 5 mgKOH/g to 50 mgKOH/g for achieving desirable low-temperature fixability and excellent charging properties.

The hydroxyl value of the crystalline resin can be measured according to the measuring method disclosed in JIS K0070-1966.

An amount of the crystalline resin in the resin particles is not particularly limited, and may be appropriately selected in accordance with the intended purpose. The amount of the crystalline resin is preferably from 3 parts by mass to 20 parts by mass, and more preferably from 5 parts by mass to parts by mass, relative to 100 parts by mass of the resin particles. When the amount of the crystalline resin is 3 parts by mass or greater relative to 100 parts by mass of the resin particles, the crystalline resin is easily softened with the amorphous resin, which is advantageous in view of low-temperature fixability. When the amount of the crystalline resin is 20 parts by mass or less relative to 100 parts by mass of the resin particles, desirable filming resistance is assured. The amount of the crystalline resin within the above-mentioned more preferred range is advantageous because both low-temperature fixability and filming resistance are achieved.

<<<Amorphous Resin>>>

The amorphous resin is not particularly limited, and may be appropriately selected in accordance with the intended purpose. Examples of the amorphous resin include a modified polyester resin (may be referred to as an "amorphous polyester resin A" hereinafter) and an unmodified polyester resin (may be referred to as an "amorphous polyester resin B" hereinafter). The above-listed examples may be used alone or in combination. Among the above-listed examples, the resin particles preferably include both the modified polyester resin and the unmodified polyester resin in each of the resin particles.

Moreover, the amorphous polyester resin preferably includes the biomass-derived resin considering environmental friendliness.

In the present specification, the amorphous resin is a resin free from the PET or PBT.

—Amorphous Polyester Resin A—

The amorphous polyester resin A (modified polyester resin) is not particularly limited, and may be appropriately selected in accordance with the intended purpose. Examples of the amorphous polyester resin A include a reaction product between an active hydrogen group-containing compound and a reaction precursor including a group reactive with the active hydrogen group-containing compound (may be referred to as a "prepolymer" hereinafter). The amorphous polyester resin A is preferably included in the core layer of each of the resin particles.

The amorphous polyester resin A is a polyester resin insoluble to tetrahydrofuran (THF). The tetrahydrofuran (THF)-insoluble polyester resin component reduces a glass transition temperature (Tg) and melt viscosity of resulting resin particles and imparts low-temperature fixability. Since the tetrahydrofuran (THF)-insoluble polyester resin component has a branched-chain structure in a molecular skeleton, a molecular chain of the amorphous polyester resin A forms a three-dimensional network structure. The three-dimensional network structure imparts rubber-like characteristics to resulting resin particles. The rubber-like characteristics are characteristics whereby the resin particles deform at a low temperature but do not flow.

—-Active Hydrogen Group-Containing Compound ——

The active hydrogen group-containing compound is a compound that can react with a polyester resin having a site that is reactive with the active hydrogen group-containing compound.

The active hydrogen group is not particularly limited, and may be appropriately selected in accordance with the intended purpose. Examples of the active hydrogen group include a hydroxyl group (e.g., an alcoholic hydroxyl group and a phenolic hydroxyl group), an amino group, a carboxyl group, and a mercapto group. The above-listed examples may be used alone or in combination.

The active hydrogen group-containing compound is not particularly limited, and may be appropriately selected in accordance with the intended purpose. When the polyester resin having a site reactive with the active hydrogen group-containing compound is a polyester resin including an isocyanate group, the active hydrogen group-containing compound is preferably any of amines because amines can increase a molecular weight of the polyester resin through an elongation reaction or cross-linking reaction between any of the amines and the polyester resin.

The amines are not particularly limited, and may be appropriately selected in accordance with the intended purpose. Examples of the amines include diamines, trivalent or higher amines, amino alcohols, aminomercaptans, amino acids, and compounds in each of which an amino group of any of the foregoing amines is blocked. The above-listed examples may be used alone or in combination. Among the above-listed examples, the above-mentioned any of amines is preferably a diamine or a mixture of a diamine with a small amount of a trivalent or higher amine.

The diamines are not particularly limited, and may be appropriately selected in accordance with the intended purpose. Examples of the diamines include aromatic diamines, alicyclic diamines, and aliphatic diamines. The above-listed examples may be used alone or in combination.

The aromatic diamines are not particularly limited, and may be appropriately selected in accordance with the intended purpose. Examples of the aromatic diamines include phenylenediamine, diethyltoluenediamine, and 4,4'-diaminodiphenylmethane.

The alicyclic diamines are not particularly limited, and may be appropriately selected in accordance with the intended purpose. Examples of the alicyclic diamines include 4,4'-diamino-3,3'-dimethyldicyclohexylmethane, diaminocyclohexane, and isophoronediamine.

The aliphatic diamines are not particularly limited, and may be appropriately selected in accordance with the intended purpose. Examples of the aliphatic diamines include ethylenediamine, tetramethylenediamine, and hexamethylenediamine.

The trivalent or higher amines are not particularly limited, and may be appropriately selected in accordance with the intended purpose. Examples of the trivalent or higher amines include diethylenetriamine and triethylenetetramine.

The amino alcohols are not particularly limited, and may be appropriately selected in accordance with the intended purpose. Examples of the amino alcohols include ethanolamine and hydroxyethylaniline.

The aminomercaptans are not particularly limited, and may be appropriately selected in accordance with the intended purpose. Examples of the aminomercaptans include aminoethylmercaptan and aminopropylmercaptan.

The amino acids are not particularly limited, and may be appropriately selected in accordance with the intended purpose. Examples of the amino acids include aminopropionic acid and aminocaproic acid.

The compounds in each of which an amino group of the amine is blocked are not particularly limited, and may be appropriately selected in accordance with the intended purpose. Examples of the compounds include ketimine compounds obtained by blocking an amino group with any of ketones, and oxazoline compounds.

Examples of the ketones include acetone, methyl ethyl ketone, and methyl isobutyl ketone.

——Reaction Precursor Having Site Reactive with Active Hydrogen Group-Containing Compound——

The reaction precursor having a site reactive with the active hydrogen group-containing compound is not particularly limited, and may be appropriately selected in accordance with the intended purpose. Examples of the reaction precursor having a site reactive with the active hydrogen group-containing compound include a polyester resin including a group reactive with the active hydrogen group-containing compound (may be referred to as a "polyester prepolymer" hereinafter).

The group reactive with the active hydrogen group-containing compound is not particularly limited, and may be appropriately selected in accordance with the intended purpose. Examples of the group reactive with the active hydrogen group-containing compound include an isocyanate group, an epoxy group, carboxylic acid, and an acid chloride group. Among the above-listed examples, the group reactive with the active hydrogen group is preferably an isocyanate group because the isocyanate group can form a urethane bond or urea bond in a resulting amorphous polyester resin A.

The reaction precursor may have a branched-chain structure derived from a trivalent or higher alcohol, or a trivalent or higher carboxylic acid, or both the trivalent or higher alcohol and the trivalent or higher carboxylic acid.

The polyester resin including an isocyanate group is not particularly limited, and may be appropriately selected in accordance with the intended purpose. Examples of the polyester resin including an isocyanate group include a reaction product between an active hydrogen group-containing polyester resin and a polyisocyanate.

——-Active Hydrogen Group-Containing Polyester Resin——

The active hydrogen group-containing polyester resin is not particularly limited, and may be appropriately selected in accordance with the intended purpose. Examples of the active hydrogen group-containing polyester resin include a polyester resin obtained through polycondensation between a multivalent alcohol and a multivalent carboxylic acid. When a plant-derived compound is used as the multivalent alcohol, or the multivalent carboxylic acid, or both, the amorphous polyester resin A is formed as a biomass-derived resin.

The multivalent alcohol is not particularly limited, and may be appropriately selected in accordance with the intended purpose. Examples of the multivalent alcohol include a diol, a trivalent or higher alcohol, and a mixture of a diol and a trivalent or higher alcohol. The above-listed examples may be used alone or in combination. Among the above-listed examples, the multivalent alcohol is preferably a diol or a mixture of a diol with a small amount of a trivalent or higher alcohol. The trivalent or higher alcohol contributes to formation of a branched-chain structure of the polyester resin including an isocyanate group.

The diol is not particularly limited, and may be appropriately selected in accordance with the intended purpose. Examples of the diol include aliphatic diols, oxyalkylene group-containing diols, alicyclic diols, alkylene oxide adducts of alicyclic diols, bisphenols, and alkylene oxide adducts of bisphenols.

Examples of the aliphatic diol include ethylene glycol, 1,2-propyleneglycol, 1,3-propyleneglycol, 1,4-butanediol, 2-methyl-1,3-propanediol, 1,5-pentanediol, 3-methyl-1,5-pentanediol, 1,6-hexanediol, 1,8-octanediol, 1,10-decanediol, and 1,12-dodecanediol.

Examples of the oxyalkylene group-containing diols include diethylene glycol, triethylene glycol, dipropylene glycol, polyethylene glycol, polypropylene glycol, and polytetramethylene glycol.

Examples of the alicyclic diols include 1,4-cyclohexanedimethanol and hydrogenated bisphenol A.

Examples of the alkylene oxide adducts of alicyclic diols include alkylene oxide (e.g., ethylene oxide, propylene oxide, and butylene oxide) adducts of the above-listed alicyclic diols.

Examples of the bisphenols include bisphenol A, bisphenol F, and bisphenol S.

Examples of the alkylene oxide adducts of bisphenols include alkylene oxide (e.g., ethylene oxide, propylene oxide, and butylene oxide) adducts of the above-listed bisphenols.

The above-listed examples may be used alone or in combination.

Among the above-listed examples, as the diol, a C3-C10 aliphatic diol (e.g., 1,2-propyleneglycol, 1,3-propyleneglycol, 1,4-butanediol, 2-methyl-1,3-propanediol, 1,5-pentanediol, and 3-methyl-1,5-pentanediol) is preferably used for controlling a glass transition temperature (Tg) of a resulting amorphous polyester resin A to 20° C. or lower.

An amount of the C3-C10 aliphatic diol is not particularly limited, and may be appropriately selected in accordance with the intended purpose. The C3-C10 aliphatic diol is preferably used in an amount of 50 mol % or greater relative to a total amount of an alcohol component in the amorphous polyester resin A.

Steric hinderance imparted to a molecular chain of the amorphous polyester resin A can reduce a melt viscosity of resulting resin particles during fixing, thus low-temperature fixability of the resin particles is easily achieved. For the reason as described, a principle chain of the aliphatic diol preferably has a structure represented by General Formula (1) below.

[General Formula (1)]

$$HO \leftarrow CR^1R^2 \rightarrow_n OH$$

In General Formula (1), $R^1$ and $R^2$ are each independently a hydrogen atom or a C1-C3 alkyl group, and n is an odd number selected from 3 to 9. Among the repeating units, where the number of the repeating units is "n" in total, $R^1$ and $R^2$ may be identical or different.

In the present disclosure, the principle chain of the aliphatic diol means a carbon chain that has the fewest number of carbon atoms to connect two hydroxyl groups of the aliphatic diol.

The number of carbon atoms of the principle chain of the aliphatic diol is preferably an odd number, because crystallinity of resulting amorphous polyester resin A is reduced owing to parity. Moreover, the aliphatic diol preferably includes one or more C1-C3 alkyl groups at a side chain of the aliphatic diol because interaction energy between principle chains of aliphatic diol molecules is reduced due to a steric effect.

The trivalent or higher alcohol is not particularly limited, and may be appropriately selected in accordance with the intended purpose. Examples of the trivalent or higher alcohol include aliphatic alcohols, trivalent or higher polyphenols, and alkylene oxide adducts of trivalent or higher polyphenols.

Examples of the aliphatic alcohols include glycerin, trimethylolethane, trimethylolpropane, pentaerythritol, and sorbitol.

Examples of the trivalent or higher polyphenols include trisphenol PA, phenol novolac, and cresol novolac.

Examples of the alkylene oxide adducts of trivalent or higher polyphenols include alkylene oxide (e.g., ethylene oxide, propylene oxide, and butylene oxide) adducts of the above-listed trivalent or higher polyphenols.

The above-listed examples may be used alone or in combination.

The multivalent carboxylic acid is not particularly limited, and may be appropriately selected in accordance with the intended purpose. Examples of the multivalent carboxylic acid include a dicarboxylic acid, a trivalent or higher carboxylic acid, and a mixture of a dicarboxylic acid and a trivalent or higher carboxylic acid. The above-listed examples may be used alone or in combination. Among the above-listed examples, the multivalent carboxylic acid is preferably trivalent or higher carboxylic acid, or a mixture of dicarboxylic acid with trivalent or higher carboxylic acid. The trivalent or higher carboxylic acid contributes to formation of a branched-chain structure of the polyester resin including an isocyanate group.

The dicarboxylic acid is not particularly limited, and may be appropriately selected in accordance with the intended purpose. Examples of the dicarboxylic acid include aliphatic dicarboxylic acids, aromatic dicarboxylic acids, anhydrides of the foregoing dicarboxylic acids, lower (C1-C3) alkyl esters of the foregoing dicarboxylic acids, and halides of the foregoing dicarboxylic acids.

Examples of the aliphatic dicarboxylic acids include succinic acid, adipic acid, sebacic acid, dodecanedioic acid, maleic acid, and fumaric acid.

Examples of the aromatic dicarboxylic acids include phthalic acid, isophthalic acid, terephthalic acid, and naphthalene dicarboxylic acid.

The above-listed examples may be used alone or in combination.

Among the above-listed examples, the dicarboxylic acid is preferably a C4-C12 aliphatic dicarboxylic acid for controlling a glass transition temperature (Tg) of the amorphous polyester resin A to 20° C. or lower, and more preferably plant-derived sebacic acid for achieving carbon neutrality.

An amount of the C4-C12 aliphatic dicarboxylic acid is not particularly limited, and may be appropriately selected in accordance with the intended purpose. The amount of the C4-C12 aliphatic dicarboxylic acid is preferably 50 mol % or greater relative to a carboxylic acid component of the amorphous polyester resin A.

The trivalent or higher carboxylic acids are not particularly limited, and may be appropriately selected in accordance with the intended purpose. Examples of the trivalent or higher carboxylic acids include trivalent or higher aromatic carboxylic acids.

The trivalent or higher aromatic carboxylic acids are not particularly limited, and may be appropriately selected in accordance with the intended purpose. Examples of the trivalent or higher aromatic carboxylic acids include C9-C20 trivalent or higher aromatic carboxylic acids, anhydrides of the C9-C20 trivalent or higher aromatic carboxylic acids, lower (C1-C3) alkyl esters of C9-C20 trivalent or higher aromatic carboxylic acids, and halides of C9-C20 trivalent or higher aromatic carboxylic acids. The above-listed examples may be used alone or in combination.

Examples of the C9-C20 trivalent or higher aromatic carboxylic acids include trimellitic acid and pyromellitic acid.

———Polyisocyanate ———

The polyisocyanate is not particularly limited, and may be appropriately selected in accordance with the intended purpose. Examples of the polyisocyanate include aromatic diisocyanates, aliphatic diisocyanates, alicyclic diisocyanates, aromatic aliphatic diisocyanates, and trivalent or higher polyisocyanates. Moreover, the polyisocyanate may be a modified product of any of the foregoing polyisocyanates. The above-listed examples may be used alone or in combination.

Examples of the aromatic diisocyanates include 1,3-phenylenediisocyanate, 1,4-phenylenediisocyanate, 2,4-tolylenediisocyanate (TDI), 2,6-tolylene diisocyanate (TDI), crude TDI, 2,4'-diphenylmethane diisocyanate (MDI), 4,4'-diphenylmethane diisocyanate (MDI), crude MDI, 1,5-naphthylene diisocyanate, 4,4',4"-triphenylmethane triisocyanate, m-isocyanatphenylsulfonyl isocyanate, and p-isocyanatophenylsulfonyl isocyanate. Examples of the crude MDI include a phosgenation product of crude diaminophenylmethane [e.g., a condensation product between formaldehyde and an aromatic amine (aniline) or a mixture of aromatic amines, and a mixture of diaminodiphenylmethane and a small amount (e.g., from 5% by mass to 20% by mass) of a trifunctional or higher polyamine], and polyallyl polyisocyanate (PAPI).

Examples of the aliphatic diisocyanates include ethylene diisocyanate, tetramethylene diisocyanate, hexamethylene diisocyanate (HDI), dodecamethylene diisocyanate, 1,6,11-undecanetriisocyanate, 2,2,4-trimethylhexamethylene diisocyanate, lysine diisocyanate, 2,6-diisocyanatomethylcaproate, bis(2-isocyanatoethyl)fumarate, bis(2-isocyantoethyl)carbonate, and 2-isocyanatoethyl-2,6-diisocyanatohexanoate.

Examples of the alicyclic diisocyanates include isophorone diisocyanate (IPDI), dicyclohexylmethane-4,4'-diisocyanate (hydrogenated MDI), cycloxylene diisocyanate, methylcycloxylene diisocyanate (hydrogenated TDI), bis(2-isocyanatoethyl)-4-cyclohexene-1,2-dicarboxylate, 2,5-norbornane diisocyanate, and 2,6-norbornane diisocyanate.

Examples of the aromatic aliphatic diisocyanates include m-xylene diisocyanate (XDI), p-xylene diisocyanate (XDI), and α,α,α',α'-tetramethylxylene diisocyanate (TMXDI).

Examples of the trivalent or higher polyisocyanates include lysine triisocyanate and diisocyanate modified products of trivalent or higher alcohols.

The modified product of the polyisocyanate is not particularly limited, and may be appropriately selected in accordance with the intended purpose. Examples of the modified product of the polyisocyanate include modified products each including a urethane group, a carbodiimide group, an allophanate group, a urea group, a biuret group, a uretdione group, an uretoneimine group, an isocyanurate group, or an oxazolidone group.

An amount of the amorphous polyester resin A is not particularly limited, and may be appropriately selected in accordance with the intended purpose. The amount of the amorphous polyester resin A is preferably from 3 parts by mass to 20 parts by mass, and more preferably from 5 parts by mass to 15 parts by mass, relative to 100 parts by mass of the resin particles. When the amount of the amorphous polyester resin A is 3 parts by mass or greater relative to 100 parts by mass of the resin particles, low-temperature fixability is assured. When the amount of the amorphous polyester resin A is parts by mass or less relative to 100 parts by mass of the resin particles, hot-offset resistance is assured. The amount of the amorphous polyester resin A within the above-mentioned more preferred range is advantageous because low-temperature fixability, hot-offset resistance, and heat-resistant storage stability are all achieved at the same time.

—Amorphous Polyester Resin B—

The amorphous polyester resin B is a polyester resin substantially free from a cross-linking structure, and is preferably a linear polyester resin. The amorphous polyester resin B may be included in the core layer or shell layer of each of the resin particles, but is preferably included in both the core layer and shell layer of each of the resin particles.

The amorphous polyester resin B is not particularly limited, and may be appropriately selected in accordance with the intended purpose. Examples of the amorphous polyester resin B include an amorphous polyester resin obtained through polycondensation between a multivalent alcohol and a multivalent carboxylic acid. The amorphous polyester resin B is preferably free from a urethane bond and a urea bond.

When a plant-derived compound is used as the multivalent alcohol, or the multivalent carboxylic acid or a derivative of the multivalent carboxylic acid, or any combination thereof, the amorphous polyester resin B is formed as a biomass-derived resin.

——Multivalent Alcohol ——

The multivalent alcohol is not particularly limited, and may be appropriately selected in accordance with the intended purpose. Examples of the multivalent alcohol include diols.

Examples of the diols include C2-C3 alkylene oxide adducts (average number of moles added: from 1 to 10) of bisphenol A, ethylene glycol, propylene glycol, neopentyl glycol, hydrogenated bisphenol A, and C2-C3 alkylene oxide adducts (average number of moles added: from 1 to 10) of hydrogenated bisphenol A.

Examples of the C2-C3 alkylene oxide adducts (average number of moles added: from 1 to 10) of bisphenol A include polyoxypropylene(2.2)-2,2-bis(4-hydroxyphenyl)propane and polyoxyethylene(2.2)-2,2-bis(4-hydroxyphenyl)propane.

The above-listed examples may be used alone or in combination. Among the above-listed examples, the multivalent alcohol is preferably plant-derived propylene glycol considering carbon neutrality.

——Multivalent Carboxylic Acid ——

The multivalent carboxylic acid is not particularly limited, and may be appropriately selected in accordance with the intended purpose. Examples of the multivalent carboxylic acid include dicarboxylic acids.

Examples of the dicarboxylic acids include adipic acid, phthalic acid, isophthalic acid, terephthalic acid, acid, fumaric acid, maleic acid, C1-C20 alkyl group-substituted or C2-C20 alkenyl group-substituted succinic acid, and modified refined rosin.

Examples of the C1-C20 alkyl group-substituted or C2-C20 alkenyl group-substituted succinic acid include dodecenylsuccinic acid and octylsuccinic acid.

The derivative of the multivalent carboxylic acid is not particularly limited, and may be appropriately selected in accordance with the intended purpose. Examples of the derivative of the multivalent carboxylic acid include multivalent carboxylic acid anhydrides and multivalent carboxylic acid esters.

For example, the modified refined rosin is preferably refined rosin modified with acrylic acid, fumaric acid, or maleic acid.

The above-listed examples may be used alone or in combination.

Among the above-listed examples, the multivalent carboxylic acid is preferably succinic acid, or terephthalic acid, or both, and more preferably plant-derived saturated aliphatic succinic acid considering carbon neutrality. The saturated aliphatic succinic acid can enhance recrystallization of the crystalline resin, can increase an aspect ratio of each grain of the crystalline resin, and can improve low-temperature fixability of resulting resin particles.

An amount of the multivalent carboxylic acid in the amorphous polyester resin B is not particularly limited, and may be appropriately selected in accordance with the intended purpose. Considering heat-resistant storage stability, 50 mol % or greater of terephthalic acid is preferably used as the multivalent carboxylic acid.

In order to adjust an acid value and hydroxyl value, the amorphous polyester resin B may include a trivalent or higher carboxylic acid, or a trivalent or higher alcohol, or both at a terminal of a molecular chain of the amorphous polyester resin B.

Examples of the trivalent or higher carboxylic acid include trimellitic acid, pyromellitic acid, and acid anhydrides of the foregoing carboxylic acids.

Examples of the trivalent or higher alcohol include glycerin, pentaerythritol, and trimethylolpropane.

A molecular weight of the amorphous polyester resin B is not particularly limited, and may be appropriately selected in accordance with the intended purpose. The amorphous polyester resin B preferably has molecular weights within the following ranges.

A weight average molecular weight (Mw) of the amorphous polyester resin B is preferably from 3,000 to 10,000, and more preferably from 4,000 to 7,000.

A number average molecular weight (Mn) of the amorphous polyester resin B is preferably from 1,000 to 4,000, and more preferably from 1,500 to 3,000.

A ratio (Mw/Mn) of the weight average molecular weight (Mw) of the amorphous polyester resin B to the number average molecular weight (Mn) of the amorphous polyester resin B is preferably from 1.0 to 4.0, and more preferably from 1.0 to 3.5.

The weight average molecular weight (Mw) and number average molecular weight (Mn) of the amorphous polyester resin B can be measured by GPC.

When the weight average molecular weight (Mw) and number average molecular weight (Mn) of the amorphous polyester resin B are equal to or greater than the lower limits of the preferred ranges, respectively, heat-resistant storage stability of resulting resin particles and durability of the resin particles against stress, such as stirring performed inside a developing device, are assured. When the weight average molecular weight (Mw) and number average molecular weight (Mn) of the amorphous polyester resin B are equal to or less than the upper limits of the preferred ranges, respectively, viscoelasticity of the resin particles as melted may be maintained at an appropriate level, and desirable low-temperature fixability is assured.

An acid value of the amorphous polyester resin B is not particularly limited, and may be appropriately selected in accordance with the intended purpose. The acid value of the amorphous polyester resin B is preferably from 1 mgKOH/g to 50 mgKOH/g, and more preferably from 5 mgKOH/g to 30 mgKOH/g. When the acid value of the amorphous polyester resin B is 1 mgKOH/g or greater, a toner including resulting resin particles tends to be negatively charged, and affinity between the toner and a recording medium, improves during fixing to the recording medium, consequently improving low-temperature fixability. When the acid value of the amorphous polyester resin B is 50 mgKOH/g or less, charging stability, especially charging stability against fluctuations of environmental conditions, is assured.

The acid value of the amorphous polyester resin B may be measured according to the measuring method disclosed in JIS K0070-1992.

A hydroxyl value of the amorphous polyester resin B is not particularly limited, and may be appropriately selected in accordance with the intended purpose. The hydroxyl value of the amorphous polyester resin B is preferably 5 mgKOH/g or greater.

The hydroxyl value of the amorphous polyester resin B may be measured according to the measuring method disclosed in JIS K0070-1966.

A glass transition temperature (Tg) of the amorphous polyester resin B is not particularly limited, and may be appropriately selected in accordance with the intended purpose. The glass transition temperature (Tg) of the amorphous polyester resin B is preferably 40° C. or higher and 80° C. or lower, and more preferably 50° C. or higher and 70° C. or lower. When the glass transition temperature (Tg) of the amorphous polyester resin B is 40° C. or higher, a toner including resulting resin particles has adequate heat-resistant storage stability and adequate durability against stress, such as stirring performed inside a developing device, and desirable filming resistance is assured. When the glass transition temperature (Tg) of the amorphous polyester resin B is 80° C. or lower, a toner including resulting resin particles adequately deform by heat and pressure applied during fixing, consequently improving low-temperature fixability.

An amount of the amorphous polyester resin B is not particularly limited, and may be appropriately selected in accordance with the intended purpose. The amount of the amorphous polyester resin B is preferably from 50 parts by mass to 90 parts by mass, and more preferably from 60 parts by mass to 80 parts by mass, relative to 100 parts by mass of the resin particles. When the amount of the amorphous polyester resin B is 50 parts by mass or greater relative to 100 parts by mass of the resin particles, a pigment or a release agent is desirably dispersed inside each of the resin particles, consequently minimizing occurrences of image fogging or defects. When the amount of the amorphous polyester resin B is 90 parts by mass or less relative to 100 parts by mass of the resin particles, appropriate amounts of the crystalline resin and amorphous polyester resin A are secured, consequently assuring low-temperature fixability. The inclusion of the amorphous polyester resin B in an amount within the more preferred range is advantageous because both high image quality and excellent low-temperature fixability are achieved.

A molecular structure of the amorphous polyester resin A and a molecular structure of the amorphous polyester resin B can be confirmed by solution or solid nuclear magnetic resonance spectroscopy (NMR), X-ray diffraction spectroscopy, gas chromatography-mass spectrometry (GC-MS), liquid chromatography-mass spectrometry (LC-MS), or infrared (IR) spectroscopy. Among the above-listed measuring methods, a simple measuring method used may be a method where a compound having no absorption, which is based on δCH (out of plane bending) of an olefin, at 965±10 $cm^{-1}$ or 990±10 $cm^{-1}$ on an infrared absorption spectrum of the compound as measured by IR spectroscopy is detected as the amorphous polyester resin A or the amorphous polyester resin B.

<<Shell Resin>>

Each of the resin particles has a core-shell structure. A resin constituting the shell layer (may be referred to as a "shell resin") is preferably formed of a binder resin free from a biomass-derived resin.

The present inventors have found that filming resistance of resin particles may not be adequate when a biomass-derived resin is exposed at a surface layer of each of the resin particles. The present inventors have found that, conversely, filming resistance of resin particles using a biomass-derived resin can be significantly improved compared to the resin particles known in the art, when the resin particles each have a core-shell structure where the shell layer is free from a biomass-derived component.

The shell resin constituting the shell layer is not particularly limited, and may be appropriately selected in accordance with the intended purpose. The shell resin is preferably the amorphous resin free from a biomass-derived resin, and more preferably the amorphous polyester resin B free from a biomass-derived resin.

Examples of the amorphous resin as the shell resin include, as described above, an amorphous resin obtained through polycondensation between a multivalent alcohol and a multivalent carboxylic acid. When a biomass-derived compound is not used as the multivalent alcohol nor the multivalent carboxylic acid, the amorphous resin can be formed as an amorphous resin free from a biomass-derived resin.

—Analysis of resin composition of shell layer—

A method of confirming the absence of the biomass-derived resin in the shell layer is not particularly limited, and may be appropriately selected in accordance with the intended purpose. For example, the absence of the biomass-derived resin can be confirmed through a composition analysis of a surface layer (i.e., the shell layer) using nanoIR (also referred to as "AMF-IR").

An IR spectrum of the surface layer (i.e., the shell layer) of each of the resin particles is acquired according to an analysis method using a combination of an atomic force microscope (AFM) of nanoIR and IR to achieve nanoscale resolution. A composition of the surface layer can be determined from the acquired IR spectrum.

Specifically, the composition analysis may be performed in the following manner. The resin particles are embedded in an epoxy-based resin, and the epoxy-based resin is cured. The cured resin is cut with a knife to expose cross-sections of the resin particles, and the resulting resin is sliced into a thickness of 50 nm by means of an ultramicrotome (Leica ULTRACUT UCT, available from Leica Microsystems, using a diamond knife) to prepare an ultra-thin cut piece of the resin particles. The prepared ultra-thin cut piece of the resin particles is collected on a substrate (ZnS), and a measuring point (i.e., the shell layer) is measured by means of a nanoscale infrared spectrometer (e.g., nanoIR2, available from Anasys Instruments Corp.) according to AFM-IR. A measuring range is set to from 1,900 $cm^{-1}$ to 910 $cm^{-1}$, and resolution is set to 2 $cm^{-1}$. From the obtained an AFM-IR absorption spectrum, a chemical structure of the measuring point (i.e., the shell layer) is determined. As a result of the above-described analysis, the presence or absence of a biomass-derived component in the surface layer (i.e., the shell layer) is identified.

A chemical structure of the core layer may be also determined by setting the core layer as the measuring point.

An average thickness of the shell layer is from 100 nm to 560 nm, preferably from 100 nm to 500 nm, and more preferably from 200 nm to 300 nm. When the average thickness of the shell layer is less than 100 nm, a core layer present inside each of resulting resin particles may not be produced, and desirable mechanical strength and filming resistance may not be assured. When the average thickness of the shell layer is greater than 560 nm, low-temperature fixability is impaired, and adequate mechanical strength and filming resistance may not be assured.

In the present specification, the "average thickness of the shell layer" means an average thickness determined by measuring a thickness of a shell layer of each of 10 resin particles, which are randomly selected, according to the method described later, and calculating a mean value of the measured thicknesses of the shell layers of the 10 resin particles.

A coverage rate of a surface of the core layer with the shell layer is not particularly limited, and may be appropriately selected in accordance with the intended purpose. The coverage rate is preferably from 70% to 100%, and more preferably from 90% to 100%. The coverage rate being 100% means that the entire surface of the core layer of each of the resin particles is completely covered with the shell layer.

The coverage rate (%) of the surface of the core layer with the shell layer is a value obtained by calculating according to Formula (3) below.

Coverage rate (%)=(area of covered region)/(entire surface area of resin particle)×100 [Formula (3)]

In Formula (3) above, the "entire surface area of resin particle" means a sum of the area of the covered region and an area of a region where the core layer is exposed; the "area of covered region" means an area of a region or regions of the core layer covered with the shell layer; the "area of a region where the core layer is exposed" is an area of a region or regions where the core layer is not covered with the shell layer.

—Method of Confirming Core-Shell Structure—

A method of confirming a core-shell structure in each of the resin particles is not particularly limited, and may be appropriately selected in accordance with the intended purpose. For example, the core-shell structure can be confirmed in the following manner. The resin particles are embedded in an epoxy-based resin, and the epoxy-based resin is cured. The cured resin is cut with a knife to expose cross-sections of the resin particles, and the resulting resin is sliced into a thickness of 80 nm by means of an ultramicrotome (Leica ULTRACUT UCT, available from Leica Microsystems, using a diamond knife) to prepare an ultra-thin cut piece of the resin particles. The prepared ultra-thin cut piece of the resin particles is exposed to a ruthenium tetroxide ($RuO_4$) gas to dye the resin particles (may be referred to as "ruthenium dyeing" hereinafter) to identify shells and cores. Then, the cross-sectional image of the resin particles is observed under a transmission electron microscope (H-7000, available from Hitachi High-Tech Corporation) at acceleration voltage of 100 kV and magnification of 15,000× to confirm the presence of the core-shell structure.

On the TEM image observed in the above-described method, the covered region of the core layer at a surface of each of the resin particles (a region of the core layer covered with the shell layer within the resin particle), and the exposed region of the core layer (a region of the core layer without being covered with the shell layer within the resin particle) may be distinguished according to a difference in brightness. Therefore, the shell layer is identified on the TEM image observed in the above-described method. Moreover, the shell layer is also identified from a contrast ratio by binarizing the TEM image using image processing software. A thickness of the shell layer can be measured from the TEM image.

Figure 6:
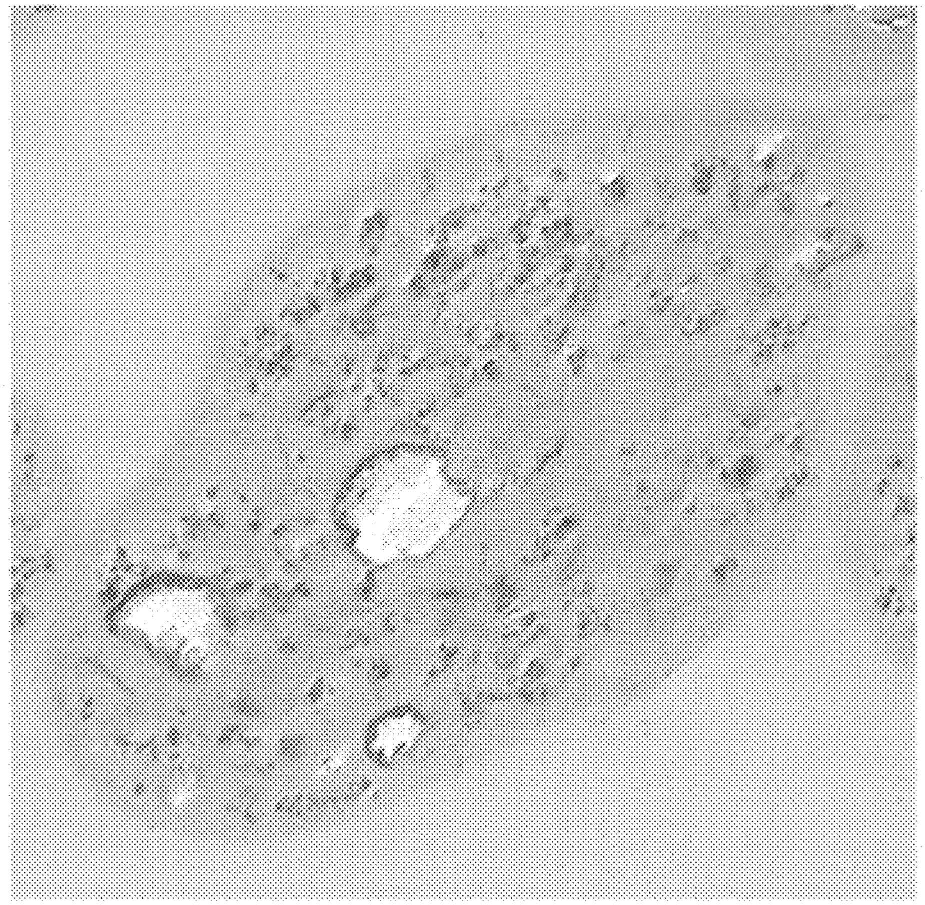
FIG. 6 is a photograph depicting an example of a TEM image of a cross-section of the resin particle of the present disclosure.

FIG. 6 depicts an example of a TEM image of a cross-section of the resin particle. As depicted in FIG. 6, the shell layer appears in the darker tone than the core layer on the image represented with the color contrast.

As the image processing software, Image-J may be used. Image-J is open-source software, and can be developed to add various types of processing and additional functions as plug-in by extending a part of the code. A calculation method of an average thickness of the shell layer using Image-J is as described below.

(1) A scale is traced using a "Straight Line" function to draw a straight line. An actual length and unit of the straight line are set using a "Set Scale" function on an "Analyze" window.

(2) A periphery of one resin particle is traced with the "Freehand-sections" function on a cross-sectional image of the one resin particle to set "Region 1."

(3) A periphery of a region of the cross-sectional image of the one resin particle excluding the shell layer (i.e., a boundary between the shell layer and the core layer) is traced with the "Freehand-sections" function to set "Region 2."

(4) A center of gravity of the "Region 1" is determined with an "Analyze" function.

(5) Using the originally developed plug-in, straight lines are drawn from coordinates towards the center of gravity of the resin particle determined in (4). The coordinates are created by evenly dividing the line tracing the periphery of the "Region 1", i.e., the periphery of the resin particle in (2), into 100 segments.

(6) On each of the 100 straight lines drawn in (5), a length obtained by subtracting the length of the straight line passing through "Region 2" from the length of the straight line passing through "Region 1" is calculated using the straight line created by tracing the scale in (1). An average length of the calculated lengths from the 100 straight lines is determined as a thickness of the shell layer of the resin particle.

(7) The operations of (2) to (6) are performed on 10 resin particles, and an average value of the thicknesses of the shell layers of the 10 resin particles is calculated. The calculated average value is determined as an average thickness of the shell layer in the resin particles of the present disclosure.

Moreover, a calculation method of a coverage rate with the shell layer using Image-J is as follows.

(1) A section of a periphery of one resin particle covered with a shell layer on a cross-sectional image of the one resin particle is traced with a "Freehand Line" function, and a length of the traced line is measured by an "Analyze" function. The measured length is determined as "Length 1."

(2) The periphery of the resin particle on the cross-sectional image of the resin particle is traced with the "Freehand Line" function, and a length of the traced line is measured by the "Analyze" function. The measured length is determined as "Length 2."

(3) A value of Length 1/Length 2×100 is calculated. The calculated value is determined as a coverage rate of the resin particle with the shell layer.

(4) The operations of (1) to (3) are performed on 10 resin particles, and an average value of the coverage rates of the 10 resin particles with the shell layers. The average value is determined as a coverage rate with the shell layer in the resin particles of the present disclosure.

<Other Components>

Other components included in the resin particles are not particularly limited, and may be appropriately selected in accordance with the intended purpose. Examples of the above-mentioned other components include a colorant, a release agent, a charge-control agent, and a cleaning improving agent. The above-listed examples may be used alone or in combination.

<<Colorant>>

The colorant is not particularly limited, and may be appropriately selected from dyes and pigments known in the art. Examples of the colorant include carbon black, a nigrosine dye, iron black, naphthol yellow S, Hansa yellow (10G, 5G, G), cadmium yellow, yellow iron oxide, yellow ocher, yellow lead, titanium yellow, polyazo yellow, oil yellow, Hansa yellow (GR, A, RN, R), pigment yellow L, benzidine yellow (G, GR), permanent yellow (NCG), Vulcan fast yellow (5G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, para-red, fiser red, parachloroorthonitro aniline red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red FSR, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, lithopone, and a mixture of any of the foregoing colorants. The above-listed examples may be used alone or in combination.

An amount of the colorant is not particularly limited, and may be appropriately selected in accordance with the intended purpose. The amount of the colorant is preferably from 1% by mass to 15% by mass, and more preferably from 3% by mass to 10% by mass, relative to a total amount of the resin particles.

The colorant may be also used as a master batch in which the colorant forms a composite with a resin.

The resin used for producing of the master batch or the resin kneaded with the master batch is not particularly limited, and may be appropriately selected in accordance with the intended purpose. Examples of the resin include, as well as the amorphous resins, polymers of styrene or substituted styrene, styrene-based copolymers, polymethyl methacrylate, polybutyl methacrylate, polyvinyl chloride, polyvinyl acetate, polyethylene, polypropylene, polyester, an epoxy resin, an epoxypolyol resin, polyurethane, polyamide, polyvinyl butyral, a polyacrylic acid resin, rosin, modified rosin, a terpene resin, an aliphatic or alicyclic hydrocarbon resin, an aromatic petroleum resin, chlorinated paraffin, and paraffin wax. The above-listed examples may be used alone or in combination.

Examples of the polymer of styrene or substituted styrene include polystyrene, poly(p-chlorostyrene), and polyvinyl toluene.

Examples of the styrene-based copolymer include a styrene-p-chlorostyrene copolymer, a styrene-propylene copolymer, a styrene-vinyl toluene copolymer, a styrene-vinyl naphthalene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-methyl α-chloromethacrylate copolymer, a styrene-acrylonitrile copolymer, a styrene-methyl vinyl ketone copolymer, a styrene-butadiene copolymer, a styrene-isoprene copolymer, a styrene-acrylonitrile-indene copolymer, a styrene-maleic acid copolymer, and a styrene-maleic acid ester copolymer.

A production method for the master batch is not particularly limited, and may be appropriately selected in accordance with the intended purpose. Examples of the production method include a method where a high shearing force is applied to mix and knead the resin for the master batch and the colorant. During the mixing and kneading, an organic solvent may be used to enhance interaction between the colorant and the resin. Moreover, a flashing method is preferably used. The flashing method is a method where an aqueous paste including a colorant and water is mixed and kneaded with a resin and an organic solvent to transfer the colorant to the side of the resin, followed by removing the water and the organic solvent. According to the flashing method, a wet cake of the colorant can be used as it is, thus it is not necessary to dry the colorant. A high-shearing disperser, such as a three-roll mill, is preferably used for the mixing and kneading.

<<Release Agent>>

The release agent is not particularly limited, and may be appropriately selected in accordance with the intended purpose. The release agent is preferably a release agent having a low melting point that is from 50° C. to 120° C. The release agent having a low melting point is dispersed in the crystalline resin or the amorphous resin to function as a release agent at an interface between a fixing roller and resulting toner particles, consequently, assuring excellent hot offset resistance in an oil-less fixing system (without applying a release agent, such as oil, to a fixing roller).

Specific examples of the release agent include wax, fatty acid amides, homopolymers or copolymers of polyacrylate, and crystalline polymers each having a long alkyl group at a side chain. The above-listed examples may be used alone or in combination.

Examples of the wax include natural wax, synthetic hydrocarbon wax, and synthetic wax.

Examples of the natural wax include vegetable wax, animal wax, mineral wax, and petroleum wax.

Examples of the vegetable wax include carnauba wax, cotton wax, Japan wax, and rice wax.

Examples of the animal wax include bees wax and lanoline wax.

Examples of the mineral wax include ozokerite and ceresin.

Examples of the petroleum wax include paraffin wax, microcrystalline wax, and petrolatum wax.

Examples of the synthetic hydrocarbon wax include Fischer-Tropsch wax and polyethylene wax.

Examples of the synthetic wax include esters, ketones, and ethers.

Examples of the fatty acid amides include 12-hydroxystearic acid amide, stearic acid amide, phthalimide, and chlorinated hydrocarbons.

Examples of the polyacrylate include low-molecular-weight crystalline polymer resins, such as poly-n-stearyl methacrylate and poly-n-lauryl methacrylate.

Examples of the homopolymers or copolymers of the polyacrylate include copolymers, such as a n-stearyl acrylate-ethyl methacrylate copolymer.

Among the above-listed examples, the release agent is preferably vegetable wax or synthesized wax formed from plant-derived monomers considering environmental friendliness.

A melting point of the release agent is not particularly limited, and may be appropriately selected in accordance with the intended purpose. The melting point of the release agent is preferably from 50° C. to 120° C., and more preferably from 60° C. to 90° C. When the melting point of the release agent is 50° C. or higher, the release agent does not adversely affect heat-resistant storage stability of resulting resin particles. When the melting point of the release agent is 120° C. or lower, the release agent can minimize occurrences of cold offset during fixing at a low temperature.

A melt viscosity of the release agent is not particularly limited, and may be appropriately selected in accordance with the intended purpose. The melt viscosity of the release agent as measured at a temperature higher than a melting point of the release agent by 20° C. is preferably from 5 cps to 1,000 cps, and more preferably from 10 cps to 100 cps. When the melt viscosity of the release agent is cps or greater, adequate releasing properties are assured. When the melt viscosity of the release agent is 1,000 cps or less, adequate hot-offset resistance and low-temperature fixability are achieved.

An amount of the release agent is not particularly limited, and may be appropriately selected in accordance with the intended purpose. When the amount of the release agent is preferably from 0% by mass to 40% by mass, and more preferably from 3% by mass to 30% by mass, relative to a total amount of the resin particles.

<<Charge-Control Agent>>

The charge-control agent is not particularly limited, and any of charge-control agents known in the art may be used. Examples of the charge-control agent include a nigrosine-based dye, a triphenylmethane-based dye, a chrome-containing metal complex dye, a molybdic acid chelate pigment, a rhodamine-based dye, an alkoxy-based amine, a quaternary ammonium salt (including a fluorine-modified quaternary ammonium salt), an alkylamide, phosphorus or a phosphorus compound, a fluorine-based active agent, a metal salt of salicylic acid, a metal salt of a salicylic acid derivative, an oxynaphthoic acid metal salt, a phenol-based condensate, an azo-pigment, a boron complex, and a functional group (e.g., a sulfonic acid group, a carboxyl group, and a quaternary ammonium salt)-containing polymer-based compound. The above-listed examples may be used alone or in combination.

Specific examples of the charge-control agent include: a nigrosine dye BONTRON 03, a quaternary ammonium salt BONTRON P-51, a metal-containing azo dye BONTRON S-34, an oxynaphthoic acid-based metal complex E-82, a salicylic acid-based metal complex E-84, and a phenol condensate E-89 (all manufactured by ORIENT CHEMI- CAL INDUSTRIES CO., LTD); a quaternary ammonium salt molybdenum complex TP-302 and TP-415 (all manufactured by Hodogaya Chemical Co., Ltd.); a quaternary ammonium salt Copy Charge PSY VP2038, a triphenyl methane derivative Copy Blue PR, a quaternary ammonium salt Copy Charge NEG VP2036, and Copy Charge NX VP434 (available from Hoechst); LRA-901 and a boron complex LR-147 (manufactured by Japan Carlit Co., Ltd.); copper phthalocyanine; perylene; and quinacridone.

An amount of the charge-control agent is not particularly limited, provided that an effect obtainable by the charge-control agent is adequately exhibited and fixability of resulting resin particles is not adversely affected. The amount of the charge-control agent may be appropriately selected in accordance with the intended purpose. The amount of the charge-control agent is preferably from 0.5% by mass to 5% by mass, and more preferably from 0.8% by mass to 3% by mass, relative to a total amount of the resin particles.

<<Cleaning Improving Agent>>

The cleaning improving agent is an agent added to the resin particles for aiding removal of a residual developer from a photoconductor or a primary transfer member after transferring. The cleaning improving agent is not particularly limited, and may be appropriately selected in accordance with the intended purpose. Examples of the cleaning improving agent include a fatty acid metal salt and polymer particles. The above-listed examples may be used alone or in combination.

Examples of the fatty acid metal salt include zinc stearate, calcium stearate, and stearic acid.

Examples of the polymer particles include polymethyl methacrylate particles and polystyrene particles. For example, the polymer particles may be formed through soap-free emulsion polymerization.

A volume average particle diameter of the polymer particles is not particularly limited, and may be appropriately selected in accordance with the intended purpose. The polymer particles preferably have a relatively narrow particle size distribution. The volume average particle diameter of the polymer particles is preferably from 0.01 μm to 1 μm.

An amount of the cleaning improving agent is not particularly limited, and may be appropriately selected in accordance with the intended purpose. The amount of the cleaning improving agent is preferably from 0.01% by mass to 5% by mass relative to a total amount of the resin particles.

A volume average particle diameter of the resin particles is not particularly limited, and may be appropriately selected in accordance with the intended purpose. The volume average particle diameter of the resin particles is preferably from 3 μm to 10 μm, and more preferably from 4 μm to 6 μm. When the volume average particle diameter of the resin particles is 3 μm or greater, cleaning properties are maintained, and stable image quality is assured. When the volume average particle diameter of the resin particles is 10 μm or less, excellent developing properties and transfer properties are assured, and improvement in image quality is expected.

<<Measurement of Volume Average Particle Diameter of Resin Particles>>

The volume average particle diameter of the resin particles may be measured by means of a particle size distribution analyzer (e.g., COULTER MULTISIZER III, available from Beckman Coulter, Inc.).

Specifically, the volume average particle dimeter is measured in the following manner. First, 2 mL of a surfactant (preferably sodium dodecylbenzenesulfonate) serving as a dispersing agent is added to 100 mL of an electrolyte solution. To the mixed solution, 10 mg of a sample (on solid basis) is added to prepare an electrolyte solution in which the sample is suspended. The electrolyte solution, in which the sample is suspended, is dispersed for from approximately 1 minute to approximately 3 minutes by means of COULTER MULTISIZER III using a 100 μm-aperture as an aperture to measure the volume and the number of the resin particles to calculate a volume distribution and a number distribution of the resin particles. A volume average particle dimeter (Dv) of the resin particles may be determined from the obtained distributions.

The electrolyte solution is prepared as an approximately 1% by mass sodium chloride aqueous solution using sodium chloride (first grade). For example, ISOTON-II (available from Beckman Coulter, Inc.) may be used as the electrolyte solution.

<<Method of Separating Constituent Components of Resin Particles>>

When a molecular weight, monomer composition, and blending ratio of each of the resins included in the resin particles, e.g., the biomass-derived resin, the PET or PBT, the crystalline resin, and the amorphous resin, one example of a method of separating each component will be described in detail hereinafter.

First, 1 g of the resin particles are added to 100 mL of chloroform, and the resulting mixture is stirred for 30 minutes at 25° C. to prepare a solution in which a soluble component of the resin particles is dissolved. The prepared solution is filtered through a membrane filter having a pore size of 0.2 μm to collect a chloroform-soluble component of the resin particles. Subsequently, the chloroform-soluble component is dissolved in chloroform, and a resulting solution is provided as a sample for GPC.

Meanwhile, a fraction collector is disposed at an eluate outlet of the GPC, and the eluate is fractionated per the predetermined count (i.e., the fractions of the eluate corresponding to the predetermined molecular weight sections among the entire area of the elution curve are collected) to collect the eluate per 5% from the elution onset of the elution curve (i.e., a rise of the elution curve) based on an area ratio. Subsequently, each of the fractions of the eluate is condensed and dried, and 30 mg of the resulting sample (solids) is dissolved in 1 mL of deuterated solvent, e.g., deuterated chloroform and deuterated THF. To the solution, 0.05% by volume tetramethylsilane (TMS) is added as a standard material. The obtained solution is poured into a glass tube for nuclear magnetic resonance (NMR) spectroscopy having a diameter of 5 mm, and a spectrum of the sample is obtained by means of a nuclear magnetic resonance spectrometer (e.g., JNM-AL400, available from JEOL Ltd.) with integrating 128 times at a temperature of from 23° C. to 25° C. A monomer composition and composition ratio of each of the amorphous polyester resin A, the amorphous polyester resin B, and the crystalline polyester C in the resin particles are determined from the peak integration ratios of the obtained spectra.

Alternatively, the collected eluate is condensed, followed by performing hydrolysis using sodium hydroxide etc. The resulting decomposed components are subjected to identification and quantification analysis, such as high-performance liquid chromatography (HPLC), to calculate a proportion of each constituent monomer of the resin particles.

<<Measurement of Molecular Weight>>

A molecular weight of each of the constituent components of the resin particles may be measured, for example, by means of a gel permeation chromatography (GPC) system in the following manner.

As a sample, a sample for GPC that is separated by the above-described method may be used. To measure a molecular weight of the sample, a molecular weight distribution of the sample is calculated from a relation between logarithmic values and count numbers of calibration curves prepared using several monodisperse polystyrene standard samples. As standard polystyrene samples for preparing calibration curves, for example, Showdex® STANDARD (available from SHOWA DENKO K.K.) Std. Nos. S-6550, S-2330, S-1700, S-740, S-10, S-662, S-2.9, and S-0.6 are used.

[Analysis Conditions]

Device: GPC-8220GPC (available from Tosoh Corporation)

Columns: 3 columns connected, TSKgel® SuperHZM-H 15 cm (available from Tosoh Corporation)

Temperature: 40° C.

Detector: refractive index (RI) detector

Solvent: tetrahydrofuran (THF) or chloroform

Feeding rate: 0.35 mL/min

Sample: injecting 100 μL of a 0.1% by mass sample Pretreatment of sample: The resin particles are dissolved in tetrahydrofuran (THF) (including a stabilizer, available from FUJIFILM Wako Pure Chemical Corporation) or chloroform to prepare a solution having a concentration of 0.1% by mass, and the resulting solution is filtered through a 0.2 μm-filter. The resulting filtrate is used as a sample.

<<Measuring Method of Melting Point (Tm) and Glass Transition Temperature (Tg)>>

In the present specification, a melting point (Tm) and glass transition temperature (Tg) of each component may be measured, for example, by means of a differential scanning calorimetry (DSC) system (Q-200, a differentia scanning calorimeter, available from TA Instruments Japan Inc.).

Specifically, a melting point and glass transition temperature of a sample may be measured in the following manner.

First, approximately 5.0 mg of a sample is placed in a sample container formed of aluminum, the sample container is placed on a holder unit, and the holder unit is set in an electric furnace. Subsequently, the measurement sample is heated from −80° C. to 150° C. in a nitrogen atmosphere at a heating rate of 10° C./min (first heating). Then, the measurement sample is cooled from 150° C. down to −80° C. at a cooling rate of 10° C./min, followed by again heating up to 150° C. at a heating rate of 10° C./min (second heating). DSC curves of the first heating and the second heating are each measured by means of a differential scanning calorimeter (Q-200, available from TA Instruments Japan Inc.).

The DSC curve of the first heating is selected from the obtained DSC curves, and a glass transition temperature of the sample from the first heating may be determined using an analysis program installed in the Q-200 system. Similarly, the DSC curve of the second heating is selected from the obtained DSC curves, and a glass transition temperature of the sample from the second heating may be determined using the analysis program installed in the Q-200 system.

The DSC curve of the first heating is selected from the obtained DSC curves, and an endothermic peak top temperature of the sample from the first heating may be determined as a melting point using the analysis program installed in the Q-200 system. Similarly, the DSC curve of the second heating is selected from the obtained DSC curves, and an endothermic peak top temperature of the sample from the second heating may be determined as a melting point using the analysis program installed in the Q-200 system.

In the present specification, a glass transition temperature and melting point of each of other constituent components, such as the amorphous polyester resin A, the amorphous polyester resin B, the crystalline polyester resin, and the release agent, an endothermic peak top temperature of each sample from the second heating is determined as a melting point, and Tg of each sample from the second heating is determined as Tg, unless otherwise stated.

Use of the resin particles is not particularly limited, and may be appropriately selected in accordance with the intended purpose. Since the resin particles are environmentally friendly and have excellent low-temperature fixability and filming resistance, the resin particles are suitably used for a toner. Accordingly, the resin particles for a toner are also within the scope of the present disclosure.

A production method for the resin particles is not particularly limited, and may be appropriately selected in accordance with the intended purpose. The resin particles are preferably produced by the below-described method of producing resin particle of the present disclosure.

(Method of Producing Resin Particles)

The method of producing resin particles of the present disclosure is a production method for the above-described resin particles of the present disclosure. The method incudes: dissolving or dispersing a binder resin including a biomass-derived resin and polyethylene terephthalate or polybutylene terephthalate in an organic solvent to prepare an oil phase, where an amount A of a biomass-derived component of the biomass-derived resin and an amount B of the polyethylene terephthalate or the polybutylene terephthalate satisfy A>B (may be referred to as "preparation of an oil phase" hereinafter); adding an aqueous phase to the oil phase to cause phase inversion emulsification from a water-in-oil dispersion liquid to an oil-in-water dispersion liquid in which particles of the oil phase are dispersed in the aqueous phase (may be referred to as "phase inversion emulsification" hereinafter); coagulating the particles in the oil-in-water dispersion liquid to prepare cohesive particles (may be referred to as "coagulating" hereinafter); and forming a shell layer on each of the cohesive particles to form resin particles each having a core-shell structure, where the core-shell structure includes the shell layer an a core layer, and an average thickness of the shell layer is from 100 nm to 500 nm (may be referred to as "formation of shells" hereinafter). The method may further include other steps, such as preparation of an aqueous phase, removal of a solvent, fusing, washing, drying, annealing, and an external additive treatment, as necessary.

<Preparation of Oil Phase>

The preparation of an oil phase includes dissolving or dispersing at least a binder resin in organic solvent to prepare an oil phase.

A preparation method of the oil phase is not particularly limited, and may be appropriately selected in accordance with the intended purpose. Examples of the preparation method include a method where raw materials of resin particles are gradually added to an organic solvent with stirring to dissolve or disperse the raw materials.

The raw materials of the resin particles include at least a binder resin, and may further include other components (e.g., a colorant, a release agent, an active hydrogen group-containing compound, a charge-control agent, and a cleaning improving agent) as necessary. The release agent may be added during the below-described coagulating.

Any of devices known in the art may be used for the dispersing. For example, a disperser, such as a bead mill and a disk mill, is used for the dispersing.

As each of the raw materials used in the preparation of the oil phase, the materials described in the section of (Resin particles) may be used.

Examples of the binder resin used in the preparation of the oil phase include the amorphous resin or prepolymer, and the PET or PBT, described in the section of (Resin particles). The above-listed examples may be used alone or in combination. The amorphous resin or prepolymer is preferably a biomass-derived resin.

Since it is preferred that the crystalline resin be present in a core of each of the resin particles considering desirable heat-resistant storage stability and low-temperature fixability, the crystalline resin may be added during the preparation of the oil phase. However, the crystalline resin is preferably added during the below-described coagulating.

The organic solvent is not particularly limited, and may be appropriately selected in accordance with the intended purpose. The organic solvent is preferably a volatile solvent having a boiling point of lower than 100° C. because the organic solvent is easily removed in the later process.

Examples of the above-described organic solvent include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, methyl isobutyl ketone, methanol, ethanol, and isopropyl alcohol. The above-listed examples may be used alone or in combination.

When the resin to be dissolved or dispersed in the organic solvent is a resin having a polyester skeleton, the organic solvent is preferably an ester-based solvent or a ketone-based solvent in view of high solubility.

Examples of the ester-based solvent include methyl acetate, ethyl acetate, and butyl acetate.

Examples of the ketone-based solvent include methyl ethyl ketone and methyl isobutyl ketone.

Among the above-listed examples, the organic solvent is preferably methyl acetate, ethyl acetate, or methyl ethyl ketone because the organic solvent is easily removed.

An amount of the organic solvent is not particularly limited, and may be appropriately selected in accordance with the intended purpose. The amount of the organic solvent is preferably from parts by mass to 300 parts by mass, more preferably from 60 parts by mass to 140 parts by mass, and yet more preferably from 80 parts by mass to 120 parts by mass, relative to 100 parts by mass of a total amount of the raw materials of the resin particles.

<Preparation of Aqueous Phase>

The preparation of an aqueous phase includes preparing an aqueous phase (aqueous medium).

The aqueous medium is not particularly limited, and may be appropriately selected from aqueous media known in the art. Examples of the aqueous medium include water, a solvent miscible with water, and a mixture of water and a solvent miscible with water.

Examples of the water include ion-exchanged water.

Examples of the solvent miscible with water include an organic solvent.

The organic solvent is not particularly limited, provided that the organic solvent is an organic solvent miscible with water. The organic solvent may be appropriately selected in accordance with the intended purpose. Examples of the organic solvent include: ester-based solvents, such as methyl acetate, ethyl acetate, and butyl acetate; ketone-based solvents, such as acetone, methyl ethyl ketone, and methyl isobutyl ketone; alcohol-based solvent, such as methanol, isopropanol, and ethylene glycol; amide-based solvents, such as dimethylformamide; ether-based solvents, such as tetrahydrofuran; and cellosolve-based solvents.

The above-listed examples may be used alone or in combination.

A concentration of the organic solvent as the aqueous medium is not particularly limited. The concentration of the organic solvent is preferably a saturation concentration or lower relative to ion-exchanged water considering granularity of particles.

<Phase Inversion Emulsification>

The phase inversion emulsification includes adding an aqueous phase to the oil phase to cause phase inversion emulsification from a water-in-oil dispersion liquid to an oil-in-water dispersion liquid in which particles of the oil phase are dispersed in the aqueous phase. As a result of the phase inversion emulsification, a particle dispersion liquid in which the oil phase is dispersed into particles is obtained.

In the process of the phase inversion emulsification, the oil phase is preferably neutralized with sodium hydroxide or an ammonia solution before adding the aqueous phase to the oil phase. As the aqueous phase is gradually added to the neutralized oil phase, phase inversion emulsification from a water-in-oil dispersion liquid to an oil-in-water dispersion liquid occurs to form a particle dispersion liquid in which particles each including raw materials of the resin particles (i.e., particles of the oil phase) are dispersed.

A volume average particle diameter of the dispersed particles (oil droplets) in the particle dispersion liquid is not particularly limited, and may be appropriately selected in accordance with the intended purpose. The volume average particle diameter is preferably from 100 nm to 2,000 nm, and more preferably from 300 nm to 800 nm.

For example, the volume average particle diameter of the dispersed particles (oil droplets) in the particle dispersion liquid may be measured by means of a particle size distribution analyzer (COULTER MULTISIZER III, available from Beckman Coulter, Inc.).

An amount of the aqueous phase relative to 100 parts by mass of the oil phase is not particularly limited, and may be appropriately selected in accordance with the intended purpose. The amount of the aqueous phase is preferably from 50 parts by mass to 2,000 parts by mass, and more preferably from 100 parts by mass to 1,000 parts by mass.

The phase inversion emulsification may be performed using a stirring blade.

The stirring blade is not particularly limited, and may be appropriately selected according to a viscosity of a solution to be stirred. Examples of the stirring blade include: stirring blades for low viscosities, such as a paddle blade and a propeller blade; stirring blades for medium viscosities, such as an anchor blade, and a MAXBLEND blade; and stirring blades for high viscosities, such as a helical ribbon impeller. Among the above-listed examples, a paddle blade or an anchor blade is preferable because a volume average particle diameter of dispersed particles (oil droplets) can be controlled to the above-described preferred range.

When the stirring blade is used, conditions, such as a tip speed, and duration and temperature for dispersing, are not particularly limited, and may be appropriately selected in accordance with the intended purpose.

When the stirring blade is used, the circumferential speed of the stirring blade is not particularly limited. The circumferential speed is preferably from 0.4 m/sec to 2.0 m/sec, and more preferably from 0.7 m/sec to 1.5 m/sec.

The duration and temperature for the stirring are not particularly limited.

<Removal of Solvent>

The removal of the solvent includes removing the organic solvent from the particle dispersion liquid obtained in the phase inversion emulsification, to thereby yield base particles.

A method of removing the organic solvent from the particle dispersion liquid is not particularly limited, and may be appropriately selected in accordance with the intended purpose. Examples of the method include: a method where an entire reaction system is gradually heated with stirring to completely evaporate and remove the organic solvent included in the oil droplets; a method where the particle dispersion liquid is sprayed into a dry atmosphere with stirring to completely remove the organic solvent included in the oil droplets; and a method where the pressure of the particle dispersion liquid is reduced to evaporate and remove the organic solvent included in the oil droplets. The above-listed examples may be used alone or in combination. Among the above-listed example, a preferable method is the method where an entire reaction system is gradually heated with stirring to completely evaporate and remove the organic solvent included in the oil droplets.

The dry atmosphere into which the particle dispersion liquid is sprayed is not particularly limited, and may be appropriately selected in accordance with the intended purpose. Examples of the dry atmosphere include a heated gas, such as air, nitrogen, carbon dioxide, and a combustion gas. Any of various general gas flows, which is heated to a temperature equal to or higher than the highest boiling point among boiling points of solvents, may be used.

The removal of the solvent may be performed by mean of a device. Examples of the device include a spray drier, a belt drier, and a rotary kiln. As the device is used, the intended quality is sufficiently acquired with a short process time.

<Coagulating>

The coagulating includes coagulating the particles in the oil-in-water dispersion liquid to prepare cohesive particles. When the method of producing resin particles include the removal of the solvent, the coagulating may include coagulating base particles, which have been subjected to the removal of the solvent, to prepare cohesive particles.

A crystalline resin is preferably added during the coagulating because the crystalline resin is finely dispersed inside each of base particles.

As the crystalline resin, the crystalline resin described in the section of (Resin Particles) may be used.

The crystalline resin is preferably added as a dispersion liquid of the crystalline resin to the cohesive particles or the base particles during the coagulating.

A dispersion liquid of the crystalline resin is not particularly limited, and may be appropriately selected in accordance with the intended purpose. The dispersion liquid of the crystalline resin is preferably a dispersion liquid in which the crystalline resin is dispersed in the aqueous medium, and more preferably a dispersion liquid neutralized with alkali, such as sodium hydroxide and an ammonia solution.

A volume average particle diameter of the dispersed particles of the crystalline resin in the dispersion liquid is not particularly limited, and may be appropriately selected in accordance with the intended purpose. The volume average particle dimeter of the dispersed particles of the crystalline resin is preferably from 100 nm to 1,000 nm, and more preferably from 100 nm to 300 nm.

For example, a volume average particle diameter of particles of the crystalline resin may be measured by means of a particle size distribution analyzer (COULTER MULTISIZER III, available from Beckman Coulter, Inc.).

A method of coagulating the dispersed particles or the base particles, or a mixture of the dispersed particles or the base particles with the crystalline resin until resulting cohesive particles reach the predetermined particle diameters is not particularly limited, and may be appropriately selected in accordance with the intended purpose. Examples of the method include: a method where a coagulant is added while the cohesive particles or dispersed particles, or a mixture of the dispersed particles or base particles with the crystalline resin is stirred; and a method where pH is adjusted while the cohesive particles or base particles, or a mixture of the cohesive particles or base particles with the crystalline resin is stirred.

When the method used is the method of adding the coagulant, the coagulant may be added as it is, but the coagulant is preferably added in the form of an aqueous solution of the coagulant so that the coagulant is distributed evenly without leaving highly concentrated areas. Moreover, the coagulant is preferably gradually added, while monitoring the particle diameter of the formed cohesive particles.

The coagulant is not particularly limited, and may be appropriately selected from coagulants known in the art. Examples of the coagulant include monovalent metal salts, divalent metal salts, and trivalent metal salts.

Examples of the monovalent metal salts include sodium salts and potassium salts.

Examples of the divalent metals include calcium salts and magnesium salts.

Examples of the trivalent metals include iron salts and aluminum salts.

A temperature for performing the coagulating (i.e., a temperature of the reaction system) is not particularly limited, and may be appropriately selected in accordance with the intended purpose. The temperature is preferably close to glass transition temperatures (Tg) of the resins used. When the temperature is too low, coagulation progresses very slowly, which may lead to inadequate production efficiency. When the temperature is too high, the coagulation speed is too fast, which may lead to an undesirable particle size distribution of resulting resin particles, such as formation of coarse particles.

In the process of the coagulating, the coagulation is terminated when the cohesive particles reach desired particle diameters.

A method of terminating the coagulating is not particularly limited, and may be appropriately selected in accordance with the intended purpose. Examples of the method include: a method where a salt having a low ionic valence or a chelating agent is added; a method where pH is adjusted; a method where a temperature of a reaction system is reduced; and a method where a large amount of an aqueous medium is added to reduce a concentration of the reaction system. The above-listed examples may be used alone or in combination.

A volume average particle diameter of the cohesive particles is not particularly limited, and may be appropriately selected in accordance with the intended purpose. The volume average particle diameter of the cohesive particles is preferably from 2 μm to 10 μm, and more preferably from 3 μm to 6 μm.

In the process of the coagulating, a release agent may be added. As the release agent, the release agent described in the section of (Resin particles) may be used.

When the release agent is added during the coagulating, cohesive particles, in each of which the release agent and the crystalline resin are homogeneously dispersed, are obtained by using a dispersion liquid, in which the release agent is dispersed in an aqueous medium, or by mixing the release agent with the resin base particles and the crystalline resin, resin, followed by coagulating.

<Formation of Shells>

The formation of shells includes forming a shell layer on each of the cohesive particles to form resin particles each having a core-shell structure, where the core-shell structure includes the shell layer and a core layer, and an average thickness of the shell layer is from 100 nm to 500 nm. When the method of producing the resin particles includes the below-described fusing, the formation of shells may include forming a shell layer on each of spherical particles formed by the fusing.

A method of forming the shell layers is not particularly limited, and may be appropriately selected in accordance with the intended purpose. Examples of the method include: a method where a dispersion liquid including a shell resin is added to the cohesive particles obtained by the coagulating, followed by heating; and a method where a dispersion liquid including a shell resin is added to spherical particles, which have been formed by the fusing and have desired particle diameters, followed by heating.

The heating may be performed at the same time as the heating is performed during the fusing, or may be performed as a separate process.

The shell resin is preferably a binder resin free from the biomass-derived resin. As the shell resin, the materials described in the section of <<Shell resin>> of (Resin particles) may be used. The shell resin is particularly preferably the amorphous polyester resin B.

A volume average particle diameter of particles of the shell resin in the dispersion liquid is not particularly limited, and may be appropriately selected in accordance with the intended purpose. The volume average particle diameter of the particles of the shell resin is preferably 10 nm or greater and 150 nm or less, and more preferably 30 nm or greater and 100 nm or less.

For example, the volume average particle diameter of the particles of the shell resin in the dispersion liquid may be measured by means of a particle size distribution analyzer (COULTER MULTISIZER III, available from Beckman Coulter, Inc.).

<Fusing>

The fusing includes fusing the resin particles obtained in the formation of shells to reduce surface irregularities of each of the resin particles to yield spherical resin particles.

A method of fusing the resin particles obtained in the formation of shells is not particularly limited, and may be appropriately selected in accordance with the intended purpose. Examples of the method include a method where a dispersion liquid of the resin particles obtained in the formation of shells is heated while stirring.

A temperature of the heating is not particularly limited, and may be appropriately selected in accordance with the intended purpose. The temperature of the heating is preferably approximately a temperature higher than a glass transition temperature (Tg) of the amorphous polyester resin B, more preferably a temperature equal to or higher than Tg of the amorphous polyester resin B by +20° C. or less, and yet more preferably a temperature equal to or higher than Tg of the amorphous polyester resin B by +10° C. or less. When the temperature of the heating is the Tg of the amorphous polyester resin B +20° C. or less, appropriate compatibility between the amorphous polyester resin and the crystalline resin is achieved so that grains of the recrystallized crystalline resin have suitable major axes without being too large, and are not exposed to a surface of each of resulting resin particles.

An average circularity of the resin particles is not particularly limited, and may be appropriately selected in accordance with the intended purpose. When the resin particles are used as a toner, as the average circularity of the resin particles increases, the resin particles roll more smoothly at a developing nip. Therefore, the average circularity of the resin particles is preferably 0.930 or greater, and more preferably 0.950 or greater, because a large amount of the resin particles can be transferred to an electrostatic latent image bearer.

—Measurement of average circularity—

In the present embodiment, an average circularity may be measured, for example, by means of a flow particle image analyzer (Sysmex FPIA-3000, available from Malvern Panalytical Ltd.).

As a specific measuring method, from 0.1 mL to 0.5 mL of a surfactant (preferably an alkyl benzene sulfonic acid salt) serving as a dispersing agent is added to from 100 mL to 150 mL of water in a container to prepare a mixture. Solid impurities have been removed from the water prior to the addition of the surfactant. Then, from approximately 0.1 g to approximately 0.5 g of a sample is added to the mixture to prepare a suspension. Next, the suspension, in which the sample is dispersed, is dispersed for approximately 1 minute to approximately 3 minutes by means of an ultrasonic disperser, and the concentration of the dispersion liquid is adjusted to the range of 3,000 particles/μL to 10,000 particles/μL. The resulting dispersion liquid is measured by means of the above-mentioned device to 1C determine an average particle diameter, average circularity, and standard deviation (SD) of circularity.

Note that, a circle equivalent diameter is determined as a particle diameter, an average particle diameter is determined using circle equivalent diameters (number basis), and analysis conditions of the flow particle image analyzer are as follows.

[Analysis Conditions]

Particle diameter range: 0.5 μm≤circle equivalent diameter (number basis)≤200.0 μm Particle shape range: 0.93<circularity≤1.00

In the present embodiment, the definition of the average circularity is as follows.

(Average circularity)=(peripheral length of circle having area identical to area of projected image of particle)/(peripheral length of projected image of particle)

<Washing>

The washing includes washing the resin particles obtained in the formation of shells or the fusing.

The dispersion liquid of the resin particles obtained by the above-described method may include subsidiary materials, such as a coagulant, as well as the resin particles. Therefore, washing is preferably performed to collect only the resin particles from the dispersion liquid of the resin particles.

A washing method of the resin particles is not particularly limited, and may be appropriately selected in accordance with the intended purpose. Examples of the washing method include centrifugation, vacuum filtration, and filter pressing.

A cake of the resin particles may be obtained by any of the above-mentioned washing methods. If washing cannot be adequately performed with one process, the obtained cake may be again dispersed in an aqueous solvent to prepare a slurry, and the slurry may be washed by any of the washing method to collect the resin particle. This series of the processes may be repeated.

When the washing is performed by the vacuum filtration or the filter pressing, an aqueous solvent is penetrated into the cake to wash out subsidiary materials attached to the resin particles.

The aqueous solvent used for the washing is not particularly limited, and may be appropriately selected in accordance with the intended purpose.

Examples of the aqueous solvent include water and a mixed solvent of water and alcohol.

Examples of the alcohol include methanol and ethanol.

Among the above-listed examples, the aqueous solvent is preferably water, considering a cost of production and reduction in adverse environmental impacts due to waste water processing.

<Drying>

The drying includes drying the resin particles washed by the washing.

The resin particles washed by the washing include a large amount of the aqueous medium. As the drying is performed to dry the washed resin particles, the aqueous medium is removed, and only the resin particles are collected.

A method of the drying is not particularly limited, and may be appropriately selected in accordance with the intended purpose. Examples of the method include a method using a dryer, such as a spray dryer, a vacuum freeze dryer, a vacuum dryer, a static tray dryer, a movable tray dryer, a fluidized bed dryer, a rotary dryer, and a stirring dryer.

A final moisture content of the dried resin particles is not particularly limited, and may be appropriately selected in accordance with the intended purpose. The moisture content is preferably less than 1% by mass.

The resin particles dried by the drying are loosely aggregated. If the aggregation of the resin particles may cause a problem during use, the loosely aggregated resin particles may be crushed to release loose aggregation.

A method of crushing is not particularly limited, and may be appropriately selected in accordance with the intended purpose. Examples of the method include a method using a device, such as a jet mill, HENSCHEL MIXER, a super mixer, a coffee mill, OSTER BLENDER, and a food processer.

<Annealing>

In the case where the crystalline resin is added, the annealing includes performing annealing after the drying. The annealing is a process of performing phase separation between the crystalline resin and the amorphous resin.

A method of the annealing is not particularly limited, and may be appropriately selected in accordance with the intended purpose. Examples of the method include a method where the resin particles are stored for 10 hours or longer at a temperature close to a glass transition temperature (Tg) of the crystalline resin.

When heating is performed at a temperature higher than a glass transition temperature (Tg) of the used resins during the fusing, the crystalline resin and the amorphous resin may be melted together, thus both heat resistant storage stability and low-temperature fixability may not be achieved. As the annealing is performed, however, phase separation between the crystalline resin and the amorphous resin occurs to eliminate the co-melted state. Therefore, the annealing is preferably performed.

<External Additive Treatment>

The external additive treatment includes mixing the resin particles obtained in the drying or the annealing with a charge-control agent or a cleaning improving agent to deposit the charge-control agent or cleaning improving agent on a surface of each of the resin particles.

According to the external additive treatment, desirable characteristics, such as flowability, charging properties, and cleaning properties, are imparted to the resin particles.

As the charge-control agent and the cleaning improving agent, the charge-control agent and the cleaning improving agent described in the section of (Resin particles) may be used.

A method of mixing the resin particles with the charge-control agent or cleaning improving agent is not particularly limited, and may be appropriately selected in accordance with the intended purpose. Examples of the method include: a method of applying impact force to the mixture of the resin particles and the charge-control agent or cleaning improving agent using a blade rotated at high speed; and a method where the mixture of the resin particles and the charge-control agent or cleaning improving agent is added to a high-speed air flow to accelerate the motion of the particles to make the particles crush into one another or to make the composite particles crush into a suitable impact board.

A device used for the mixing is not particularly limited, and may be appropriately selected in accordance with the intended purpose. Examples of the device include an ang-mill (available from HOSOKAWA MICRON CORPORATION), an I-type mill (available from Nippon Pneumatic Mfg. Co., Ltd.) or a device obtained by modifying any of the foregoing devices to reduce pulverization air pressure, a hybridization system (available from NARA MACHINERY CO., LTD.), Kryptron System (available from Kawasaki Heavy Industries, Ltd.), and an automatic mortar.

Since the resin particles are environmentally friendly and have excellent low-temperature fixability, heat-resistant storage stability, and filming resistance, the resin particles are suitably used for a toner. Accordingly, the present disclosure includes toner resin particles that are the resin particles used for a toner.

(Toner)

The toner of the present disclosure includes the resin particles of the present disclosure, preferably further includes one or more external additives, and may further include other components as necessary.

<Resin Particles>

The resin particles are as described in the section of (Resin particles), thus detailed description of the resin particles is omitted here.

In the toner, the resin particles serve as toner base particles.

An amount of the resin particles in the toner is not particularly limited, and may be appropriately selected in accordance with the intended purpose. The toner may be made up of only the resin particles.

<External Additive(s)>

The external additive(s) is not particularly limited, and may be appropriately selected in accordance with the intended purpose. Examples of the external additive(s) include inorganic particles and polymer particles. The above-listed examples may be used alone or in combination.

Examples of the inorganic particles include silica, alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride.

An average particle diameter of primary particles of the inorganic particles is not particularly limited, and may be appropriately selected in accordance with the intended purpose. The average particle diameter of primary particles of the inorganic particles is preferably from 5 nm to 2 μm, and more preferably from 5 nm to 500 nm.

A BET specific surface area of the inorganic particles is not particularly limited, and may be appropriately selected in accordance with the intended purpose. The BET specific surface area of the inorganic particles is preferably from 20 $m^2/g$ to 500 $m^2/g$.

Examples of the polymer particles include: polymer particles, such as particles of polystyrene, a methacrylic acid ester copolymer, or an acrylic acid ester copolymer obtained through soap-free emulsion polymerization, suspension polymerization, or dispersion polymerization; polymer particles of a polycondensation-based polymer, such as silicone, benzoguanamine, and nylon; and polymer particles of a thermoset resin.

A surface treatment may be performed on the external additive to increase hydrophobicity of the external additive to minimize reduction in flowability or charging properties under high humidity conditions.

A surface-treating agent used for the surface treatment is not particularly limited, and may be appropriately selected in accordance with the intended purpose. Examples of the surface-treating agent include a silane coupling agent, a silylating agent, a fluoroalkyl group-containing silane coupling agent, an organic titanate-based coupling agent, an aluminum-based coupling agent, silicone oil, and modified silicone oil.

An amount of the external additive(s) is not particularly limited, and may be appropriately selected in accordance with the intended purpose. The amount of the external additive(s) is preferably from 0.01% by mass to 5% by mass relative to a total amount of the resin particles.

<Other Components>

Other components in the toner are not particularly limited, provided that the above-mentioned other components can be used for toners. The above-mentioned other components may be appropriately selected in accordance with the intended purpose.

An amount of the above-mentioned other components is not particularly limited, and may be appropriately selected in accordance with the intended purpose.

Since the toner includes the resin particles, the toner is environmentally friendly, and has excellent low-temperature fixability, heat-resistant storage stability, and filming resistance.

A production method for the toner is not particularly limited, and may be appropriately selected from production methods known in the art. Examples of the production method include a method where the resin particles serving as the toner base particles are mixed with one or more external additives. During the mixing, mechanical impacts are preferably applied because detachment of the particles of the external additive from surfaces of the toner base particles may be minimized.

A method of applying the mechanical impacts is not particularly limited, and may be appropriately selected in accordance with the intended purpose. Examples of the method include: a method of applying impact force to the mixture of the resin particles and the external additive(s) using a blade rotated at high speed; and a method where the mixture of the resin particles and the external additive(s) is added to a high-speed air flow to accelerate the motion of the particles to make the particles crush into one another or to make the particles crush into a suitable impact board.

(Developer)

The developer of the present disclosure includes at least the toner of the present disclosure, and may further include other appropriately selected components, such as a carrier, in accordance with the intended purpose.

Since the toner included in the developer of the present disclosure includes the resin particles of the present disclosure, the developer is environmentally friendly and has excellent low-temperature fixability, heat-resistant storage stability, and filming resistance.

The developer may be a one-component developer or a two-component developer. In the case where the developer is used for high-speed printers corresponding to information processing speed that has been improved in recent years, the developer is preferably a two-component developer considering improvement in a service life of the developer.

When the developer is a one-component developer, particle diameters of the toner particles do not noticeably vary even after replenishing the toner. Therefore, filming of the toner to a developing roller is minimized, or fusion of the toner to a member used for leveling the toner into a thin layer, such as a blade, is minimized. As a result, excellent and stable developing performance and formation of excellent images are assured even after stirring the developer in a developing device over a long period.

When the developer is a two-component developer, particle diameters of the toner particles do not noticeably vary even after replenishing the developer with the toner over a long period. As result, excellent and stable developing performance and formation of excellent images are assured even after stirring the developer in a developing device over a long period.

<Carrier>

The carrier is not particularly limited, and may be appropriately selected in accordance with the intended purpose. The carrier includes carrier particles. Each of the carrier particles preferably includes a core particle and a resin layer covering the core particle.

<<Core Particles>>

A material of the core particles is not particularly limited, and may be appropriately selected in accordance with the intended purpose. Examples of the material of the core particles include a manganese-strontium-based material of from 50 emu/g to 90 emu/g and a manganese-magnesium-based material of from 50 emu/g to 90 emu/g. For assuring image density, moreover, a hard-magnetic material, such as an iron powder of 100 emu/g or greater and magnetite of from 75 emu/g to 120 emu/g, is preferably used. Moreover, a soft-magnetic material, such as a copper-zinc-based magnetic material of from emu/g to 80 emu/g, is preferably used because an impact of the developer held in the form of a brush (i.e., a magnetic brush) against the photoconductor can be reduced, and a high image quality can be assured. The above-listed examples may be used alone or in combination.

A volume average particle diameter of the core particles is not particularly limited, and may be appropriately selected in accordance with the intended purpose. The volume average particle diameter of the core particles is preferably 10 μm or greater and 150 μm or less, and more preferably 40 μm or greater and 100 μm or less. When the volume average particle diameter of the core particles is 10 μm or greater, a proportion of fine particles to the entire amount of the core particles decreases, and the decreased proportion of the fine particles leads to improvement in magnification per particle, consequently minimizing carrier scattering. When the volume average particle diameter of the core particles is 150 μm or less, a resulting carrier has a large specific surface area, and the carrier having a large specific surface area reduces toner scattering, consequently assuring excellent reproducibility of a solid image, especially a full-color image having a large solid image area.

When the toner is used for a two-component developer, the toner is mixed with the carrier. An amount of the carrier in the two-component developer is not particularly limited, and may be appropriately selected in accordance with the intended purpose. The amount of the carrier is preferably 90 parts by mass or greater and 98 parts by mass or less, and more preferably 93 parts by mass or greater and 97 parts by mass or less, relative to 100 parts by mass of the two-component developer.

The developer is suitably used for image formation according to various electrophotographic methods known in the art, such as a magnetic one-component developing method, a non-magnetic one-component developing method, and a two-component developing method.

(Toner Storage Unit)

The toner storage unit of the present disclosure includes a unit configured to store a toner, and a toner stored in the unit.

The toner stored in the toner storage unit is the toner of the present disclosure. Therefore, the toner storage unit of the present disclosure is environmentally friendly.

An embodiment of the toner storage unit is not particularly limited, provided that the toner storage unit is capable of storing the toner. The embodiment of the toner storage unit may be appropriately selected in accordance with the intended purpose. Examples of the embodiment of the toner storage unit include a toner storage container, a developing device, and a process cartridge.

<Toner Storage Container>

The toner storage container is a container in which the toner is stored.

The toner storage container is not particularly limited, and may be appropriately selected from toner storage containers known in the art. Examples of the toner storage container include a combination of a container main body and a cap.

A size of the container main body is not particularly limited, and may be appropriately selected.

A shape of the container main body is not particularly limited, and may be appropriately selected. The shape of the container main body is preferably a cylinder.

A structure of the container main body is not particularly limited, and may be appropriately selected. When a groove is spirally formed along an inner circumferential surface of the container main body, as the container main body is rotated, the toner, which is the content of the container, moves towards an outlet of the container main body. The structure of the container main body is preferably a structure where part of or the whole of the groove spirally formed along the inner circumference surface of the cylindrical container main body is pleated like a bellows.

A material of the container main body is not particularly limited, and may be appropriately selected. The material of the container main body is preferably a material capable of achieving great precision in size. Examples of the material of the container main body include resin materials, such as a polyester resin, a polyethylene resin, a polypropylene resin, a polystyrene resin, a polyvinyl chloride resin, polyacrylic acid, a polycarbonate resin, an ABS resin, and a polyacetal resin. The above-listed examples may be used alone or in combination.

Since the toner storage container facilitates easy storage and transportation of the toner, and allows effortless handling, the toner storage container is detachably mounted in a process cartridge or an image forming apparatus, and is used for replenishing the toner.

<Developing Device>

The developing device is a developing unit in which the toner is stored.

The developing unit is not particularly limited, and may be appropriately selected in accordance with the intended purpose. For example, the developing unit includes the toner storage container and a toner bearer configured to bear and transport the toner stored in the toner storage container.

The developing unit may further include a regulating member configured to regulate a thickness of a layer of the toner borne on the toner bearer.

<Process Cartridge>

The process cartridge includes at least an electrostatic latent image bearer and a developing unit as an integrated body, stores the toner therein, and is detachably mounted in an image forming apparatus. The process cartridge may further include at least one selected from the group consisting of a charging unit, an exposing unit, a cleaning unit, and a charge-eliminating unit, as necessary.

As an example of the process cartridge, suitably used is a process cartridge that is configured such that the process cartridge is detachably mounted in various image forming apparatuses, and includes at least an electrostatic latent image bearer and a developing unit, where the electrostatic latent image bearer is configured to bear an electrostatic latent image thereon, and the developing unit is configured to develop the electrostatic latent image borne on the electrostatic latent image bearer with the toner to form a toner image. The process cartridge may further include other units as necessary.

One embodiment of the process cartridge is illustrated in FIG. 1. As illustrated in FIG. 1, the process cartridge 110 of the present disclosure includes an electrostatic latent image bearer 10, which is mounted inside the process cartridge 110, and further includes a charger 58 serving as a charging unit, a developing device 40 serving as a developing unit, and a cleaning device 90 serving as a cleaning unit. The process cartridge 110 may further include other units as necessary. In FIG. 1, the reference L denotes exposure light emitted from an exposing unit (not illustrated) and the numerical reference 95 denotes recording paper.

As the electrostatic latent image bearer 10, an electrostatic latent image bearer identical to the below-described electrostatic latent image bearer in the image forming apparatus may be used. Moreover, an appropriately selected charger may be used as the charger 58.

According to an image forming process performed by the process cartridge illustrated in FIG. 1, an image is formed in the following manner. The electrostatic latent image bearer 10 is charged by the charger 58 while rotating in the direction indicated with the arrow, and the charged surface of the electrostatic latent image bearer 10 is exposed to exposure light L by the exposing unit to form an electrostatic latent image corresponding to the exposure image formed of the exposure light L.

The electrostatic latent image is developed with a toner by the developing device 40 to form a toner image, the toner image is transferred to recording paper 95 by the transfer roller 80, and the recording paper 95 on which the toner image is printed is discharged. After transferring the image, the surface of the electrostatic latent image bearer is cleaned by the cleaning device 90, and the residual charge of the electrostatic latent image bearer 10 is eliminated by a charge-eliminating unit (not illustrated). Then, the above-described processes are repeated again.

(Image Forming Apparatus and Image Forming Method)

The image forming apparatus of the present disclosure includes an electrostatic latent image bearer, an electrostatic latent image forming unit configured to form an electrostatic latent image on the electrostatic latent image bearer, and a developing unit storing a toner and configured to develop the electrostatic latent image formed on the electrostatic latent image bearer with the toner to form a visible image. The image forming apparatus may further include other units. The toner stored in the developing unit is the toner of the present disclosure.

The image forming method discussed in connection with the present disclosure includes forming an electrostatic latent image on an electrostatic latent image bearer (which may be referred to as a formation of an electrostatic latent image hereinafter), and developing the electrostatic latent image formed on the electrostatic latent image bearer with a toner to form a visible image (which may be referred to as developing). The image forming method may further include other steps. The toner used in the developing is the toner of the present disclosure.

The image forming method is suitably performed by the image forming apparatus. The image forming method of the present disclosure will be described together with the image forming apparats of the present disclosure, hereinafter.

<Electrostatic Latent Image Bearer>

A material, structure, and size of the electrostatic latent image bearer (may be referred to as a "photoconductor" hereinafter) are not particularly limited and may be appropriately selected from materials, structures, and sizes known in the art.

Examples of the material of the electrostatic latent image bearer include an inorganic photoconductor and an organic photoconductor.

Examples of the inorganic photoconductor include amorphous silicon and selenium.

Examples of the organic photoconductor include polysilane and phthalopolymethine.

Among the above-listed examples, the material of the electrostatic latent image bearer is preferably amorphous silicon considering a long service life.

As the amorphous silicon photoconductor, for example, the following photoconductor can be used. That is, an amorphous photoconductor produced by heating a support to a temperature of from 50° C. to 400° C., and forming a photoconductive layer formed of amorphous silicon (a-Si) on the support according to a film formation method, such as vacuum vapor deposition, sputtering, ion plating, thermal chemical vapor deposition (CVD), photo CVD, and plasma CVD. Among the above-listed examples, the film formation method is preferably plasma CVD where a raw material gas is decomposed by direct-current, high frequency, or microwave glow discharge to deposit an a-Si film on a support.

A shape of the electrostatic latent image bearer is not particularly limited, and may be appropriately selected in accordance with the intended purpose. The shape of the electrostatic latent image bearer is preferably a cylinder.

An outer diameter of the cylinder of the electrostatic latent image bearer is not particularly limited, and may be appropriately selected in accordance with the intended purpose. The outer diameter is preferably 3 mm or greater and 100 mm or less, more preferably 5 mm or greater and 50 mm or less, and particularly preferably 10 mm or greater and 30 mm or less.

<Electrostatic Latent Image Forming Unit and Formation of Electrostatic Latent Image>

The electrostatic latent image forming unit is a unit configured to form an electrostatic latent image on the electrostatic latent image bearer.

The formation of an electrostatic latent image includes forming an electrostatic image on the electrostatic latent image bearer.

The formation of an electrostatic latent image is suitably performed by the electrostatic latent image forming unit.

The electrostatic latent image forming unit is not particularly limited, and may be appropriately selected in accordance with the intended purpose. Examples of the electrostatic latent image forming unit include a unit including a charging unit configured to charge a surface of the electrostatic latent image bearer and an exposing unit configured to expose to the surface of the electrostatic latent image bearer to light to correspond to an image to be formed.

The formation of an electrostatic latent image is not particularly limited, and may be appropriately selected in accordance with the intended purpose. For example, the formation of an electrostatic latent image may be performed by charging a surface of the electrostatic latent image bearer, followed by exposing the surface of the electrostatic latent image bearer to light to correspond to an image to be formed.

<<Charging Unit and Charging>>

The charging unit is not particularly limited, and may be appropriately selected from charging units known in the art in accordance with the intended purpose. Examples of the charging unit include: contact chargers; and non-contact chargers utilizing corona discharge, such as corotron, and scorotron.

The non-contact charger is preferably equipped with a conductor or semiconductor roller, brush, film, or rubber blade.

For example, the charging is performed by applying voltage to a surface of the electrostatic latent image bearer using the charging unit.

A form of the charging unit may be any shape, such as a magnetic brush and a fur brush, as well as a roller. The form of the charging unit may be selected depending on specifications or an embodiment of the image forming apparatus.

The charging unit is not limited to the contact charger, but the contact charger is preferably used because the charging unit generally generates ozone but an image forming apparatus using the contact charger discharges less ozone.

<<Exposing Unit and Exposing>>

The exposing unit is not particularly limited, provided that the exposing unit is capable of exposing the surface of the electrostatic latent image bearer charged by the charging unit to light to correspond to an image to be formed. The exposing unit may be appropriately selected in accordance with the intended purpose. Examples of the exposing unit include various exposing units, such as copy optical exposing units, rod lens array exposing units, laser optical exposing units, and liquid crystal shutter optical exposing units.

A light source used for the exposing unit is not particularly limited, and may be appropriately selected in accordance with the intended purpose. Examples of the light source include general light emitters, such as a fluorescent lamp, a tungsten lamp, a halogen lamp, a mercury lamp, a sodium vapor lamp, a light emitting diode (LED), a semiconductor laser (LD), and an electroluminescent light (EL).

For applying only light having a desired wavelength range, various filters, such as a sharp-cut filter, a band-pass filter, a near infrared ray-cut filter, a dichroic filter, an interference filter, and a color temperature conversion filter, may be used.

For example, the exposing may be performed by exposing the surface of the electrostatic latent image bearer to light to correspond to an image to be formed using the exposing unit.

In the present disclosure, a back-exposure system may be employed. The back-exposure system is a system where the back side of the electrostatic latent image bearer is exposed to light to correspond to an image to be formed.

<Developing Unit and Developing>

The developing unit is a unit storing a toner and configured to develop the electrostatic latent image formed on the electrostatic latent image bearer with the toner to form a visible image.

The developing includes developing the electrostatic latent image formed on the electrostatic latent image bearer with a toner to form a visible image.

The developing is suitably performed by the developing unit.

The developing unit is not particularly limited, and may be appropriately selected in accordance with the intended purpose. The developing unit may employ a dry developing system or a wet developing system. Moreover, the developing unit may be a developing unit for a single color or a developing unit for multiple colors. Among the above-listed examples, the developing unit is preferably a developing device including a stirrer and a rotatable developer bearer, where the stirrer is configured to stir the toner to charge the toner with friction, and the developer bearer includes a magnetic field generating unit inside of the developer bearer and is configured to bear the toner on a surface of the developer bearer.

In the developing unit, the toner and a carrier are stirred to charge the toner with friction, the charged toner is held on a rotating magnetic roller in the form of a brush to form a magnetic brush. The magnetic roller is disposed close to the electrostatic latent image bearer, thus part of the toner constituting the magnetic brush formed on the surface of the magnetic roller is moved onto a surface of the electrostatic latent image bearer by electric suction force. As a result, the electrostatic latent image is developed with the toner to form a visible image formed of the toner on the surface of the electrostatic latent image bearer.

The carrier is not particularly limited, and may be appropriately selected in accordance with the intended purpose. For example, the carrier described in the section of (Developer) may be used.

<Other Units and Other Steps>

The above-mentioned other units are not particularly limited, and may be appropriately selected in accordance with the intended purpose. Examples of the above-mentioned other units include a transferring unit, a fixing unit, a cleaning unit, a charge-eliminating unit, a recycling unit, and a controlling unit.

The above-mentioned other steps are not particularly limited, and may be appropriately selected in accordance with the intended purpose. Examples of the above-mentioned other steps include transferring, fixing, cleaning, charge eliminating, recycling, and controlling.

The transferring is suitably performed by the transferring unit, the fixing is suitably performed by the fixing unit, the cleaning is suitably performed by the cleaning unit, the charge eliminating is suitably performed by the charge-eliminating unit, the recycling is suitably performed by the recycling unit, and the controlling is suitably performed by the controlling unit.

<<Transferring Unit and Transferring>>

The transferring unit is a unit configured to transfer the visible image, which has been formed by the developing unit, to a recording medium.

The transferring including transferring the visible image, which has been formed in the developing, to a recording medium.

The transferring unit is not particularly limited, and may be appropriately selected in accordance with the intended purpose. A preferable embodiment of the transferring unit includes a primary transferring unit and a secondary transferring unit. The primary transferring unit is configured to transfer the visible images onto an intermediate transfer member to form a composite transfer image. The secondary transferring unit is configured to transfer the composite transfer image to a recording medium.

The transferring is not particularly limited, and may be appropriately selected in accordance with the intended purpose. A preferable embodiment of the transferring includes primary transferring a visible image on an intermediate transfer member, followed by secondary transferring the visible image onto a recording medium.

When an image secondary-transferred onto the recording medium is a color image made up of two or more color-toners, single-color toners of different colors are sequentially superimposed on the intermediate transfer member by the transferring unit to form images on the intermediate transfer member, and secondary transferring the images on the intermediate transfer member collectively to the recording medium.

The intermediate transfer member is not particularly limited, and may be appropriately selected from transfer members know in the art in accordance with the intended purpose. Examples of the intermediate transfer member include a transfer belt.

The transferring unit (e.g., the primary transferring unit and the secondary transferring unit) preferably includes at least a transfer member configured to charge and release the visible image formed on the photoconductor to the side of the recording medium.

The transfer member is not particularly limited, and may be appropriately selected in accordance with the intended purpose. Examples of the transfer member include a corona transfer charger using corona discharge, a transfer belt, a transfer roller, a pressure transfer roller, and an adhesion transfer member.

The recording medium is typically plain paper. The recording medium is not particularly limited, provided that an unfixed image before developing can be transferred on the recording medium. The recording medium may be appropriately selected in accordance with the intended purpose. As the recording medium, a PET base for an overhead projector (OHP) may be used.

<<Fixing Unit and Fixing>>

The fixing unit is a unit configured to fix the transferred visible image on the recording medium.

The fixing includes fixing the transferred visible image on the recording medium.

The fixing unit is not particularly limited, and may be appropriately selected in accordance with the intended purpose. The fixing unit is preferably a heat-press member known in the art.

The heat-press member is not particularly limited, and may be appropriately selected in accordance with the intended purpose. Examples of the heat-press member include: a combination of a heat roller and a press roller; and a combination of a heat roller, a press roller, and an endless belt.

In the present disclosure, for example, a known optical fixing device may be used in combination with or instead of the fixing unit in accordance with the intended purpose.

The fixing is not particularly limited, and may be appropriately selected in accordance with the intended purpose. For example, the fixing may be performed every time an image of each color toner is transferred to the recording medium, or may be performed once images of all of color toners are superimposed on the recording medium.

A heating temperature of the heat-press member is not particularly limited, and may be appropriately selected in accordance with the intended purpose. The heating temperature is preferably 80° C. or higher and 200° C. or lower.

The surface pressure applied during the fixing is not particularly limited, and may be appropriately selected in accordance with the intended purpose. The surface pressure is preferably 10 $N/cm^2$ or greater and 80 $N/cm^2$ or less.

<<Cleaning Unit and Cleaning>>

The cleaning unit is a unit configured to remove the toner remaining on the photoconductor.

The cleaning includes removing the toner remaining on the photoconductor.

The cleaning unit is not particularly limited, and may be appropriately selected in accordance with the intended purpose. Examples of the cleaning unit include a magnetic brush cleaner, an electrostatic brush cleaner, a magnetic roller cleaner, a blade cleaner, a brush cleaner, and a web cleaner.

<<Charge-Eliminating Unit and Charge Eliminating>>

The charge-eliminating unit is a unit configured to apply charge-eliminating bias to the photoconductor to eliminate the charge of the photoconductor.

The charge eliminating includes applying charge-eliminating bias to the photoconductor to eliminate the charge of the photoconductor.

The charge-eliminating unit is not particularly limited, and may be appropriately selected in accordance with the intended purpose. Examples of the charge-eliminating unit include a charge-eliminating lamp.

<<Recycling Unit and Recycling>>

The recycling unit is a unit configured to transport the toner, which has been removed by the cleaning unit, to the developing unit to recycle.

The recycling includes transporting the toner, which has been removed by the cleaning, to the developing unit to recycle in the developing.

The recycling unit is not particularly limited, and may be appropriately selected in accordance with the intended purpose. Examples of the recycling unit include a transporting unit known in the art.

<<Controlling Unit and Controlling>>

The controlling unit is a unit configured to control operation of each unit.

The controlling includes controlling operation of each unit in each step.

The controlling unit is not particularly limited, and may be appropriately selected in accordance with the intended purpose. Examples of the controlling unit include devices, such as a sequencer and a computer.

Next, embodiments of the image forming apparatus of the present disclosure and the image forming method of the present disclosure will be described with reference to FIGS. 2 to 5.

A color image forming apparatus 100A illustrated in FIG. 2 includes a photoconductor drum (may be referred to as a "photoconductor 10" hereinafter) serving as the electrostatic latent image bearer, a charging roller 20 serving as the charging unit, an exposure device 30 serving as the exposing unit, a developing device 40 serving as the developing unit, an intermediate transfer member 50, a cleaning device 60 serving as the cleaning unit having a cleaning blade, and a charge-eliminating lamp 70 serving as the charge-eliminating unit.

Figure 2:
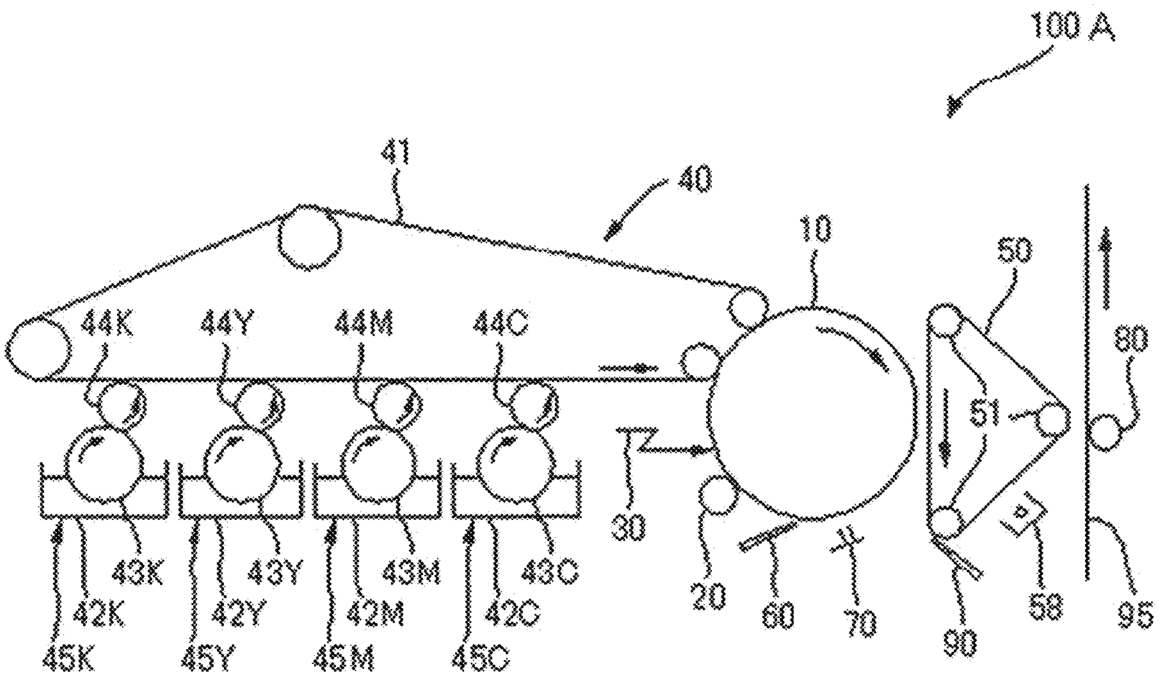
FIG. 2 is a schematic view illustrating an example of the image forming apparatus of the present disclosure.

The intermediate transfer member 50 is an endless belt, and is rotatably driven by three rollers 51 in the direction indicated with an arrow in FIG. 2. The three rollers 51 are disposed inside the loop of the endless belt to support the endless belt. Part of the three rollers 51 may also function as a transfer bias roller capable of applying predetermined transfer bias (or primary transfer bias) to the intermediate transfer member 50. The cleaning device 90 including the cleaning blade is disposed closely to the intermediate transfer member 50. Moreover, the transfer roller 80 is disposed closely to the intermediate transfer member 50 in a manner that the transfer roller 80 faces the intermediate transfer transfer member 50. The transfer roller 80 serves as the transferring unit capable of applying transfer bias for transferring (or secondary transferring) the developed image (also referred to as the visible image or the toner image) to transfer paper 95 serving as the recording medium. The corona charger 58 configured to apply charge to the toner image on the intermediate transfer member 50 is disposed in a position at the periphery of the intermediate transfer member 50, where the position is located between a contact area between the photoconductor 10 and the intermediate transfer member 50, and the contact area between the intermediate transfer member 50 and the transfer paper 95 relative to the rotational direction of the intermediate transfer member 50.

The developing device 40 includes a developing belt 41 serving as the developer bearing member, and a black developing unit 45K, a yellow developing unit 45Y, a magenta developing unit 45M, and a cyan developing unit 45C, which are disposed in series at the periphery of the developing belt 41. The black developing unit 45K includes a developer storage unit 42K, a developer supply roller 43K, and a developing roller 44K. The yellow developing unit 45Y includes a developer storage unit 42Y, a developer supply roller 43Y, and a developing roller 44Y. The magenta developing unit 45M includes a developer storage unit 42M, a developer supply roller 43M, and a developing roller 44M. The cyan developing unit 45C includes a developer storage unit 42C, a developer supply roller 43C, and a developing roller 44C. Moreover, the developing belt 41 is an endless belt rotatably supported by two or more belt rollers. Part of the developing belt 41 comes into contact with the electrostatic latent image bearer 10.

In the color image forming apparatus 100A of FIG. 2, for example, the charging roller 20 uniformly charges a surface of the photoconductor drum 10. The exposure device 30 exposes the charged surface of the photoconductor drum 10 to light to correspond to an image to be formed, thus, forming an electrostatic latent image. The toner is supplied from the developing device 40 to develop the electrostatic latent image formed on the photoconductor drum 10, thus, forming a toner image. Voltage is applied from the roller 51 to the toner image to transfer (primary transfer) the toner image onto the intermediate transfer member 50, followed by transferring (secondary transferring) onto transfer paper 95. As a result, the transferred image is formed on the transfer paper 95. The residual toner on the photoconductor 10 is removed by the cleaning device 60. The residual charge of the photoconductor is temporarily removed by the charge-eliminating lamp 70.

Figure 3:
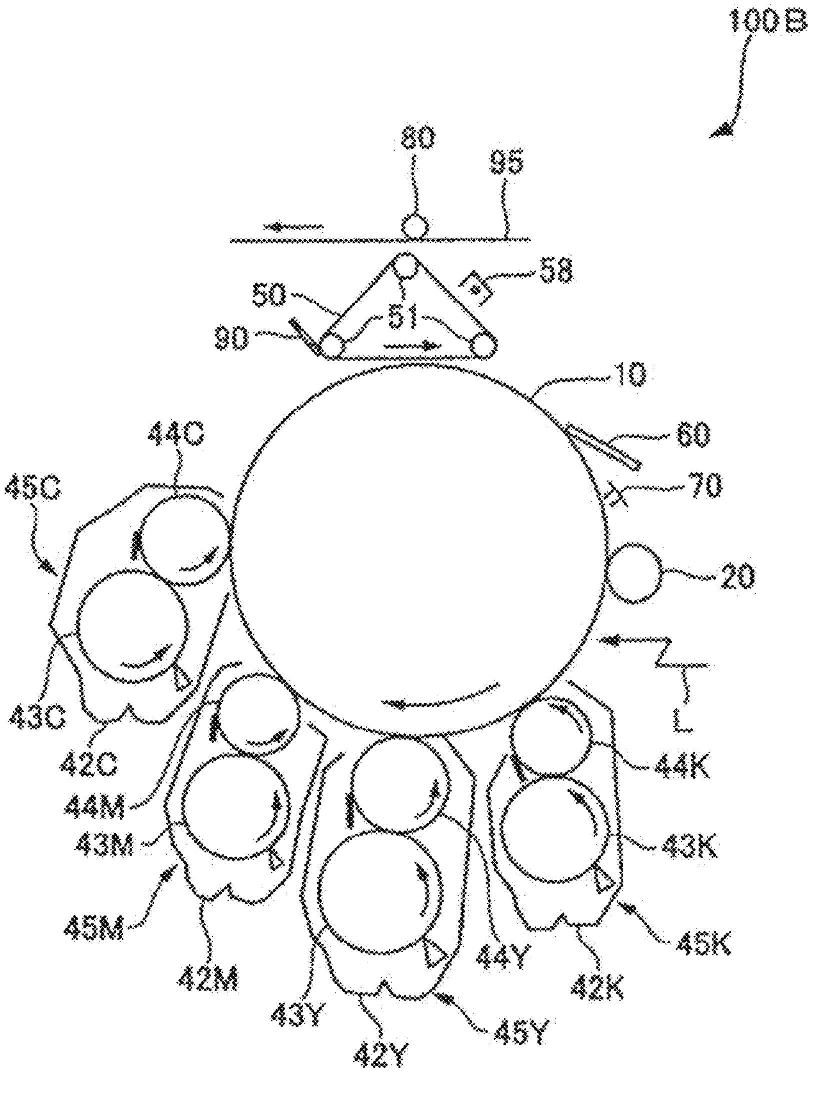
FIG. 3 is a schematic view illustrating another example of the image forming apparatus of the present disclosure.

FIG. 3 illustrates another example of the image forming apparatus of the present disclosure. The image forming apparatus 100B has the structure identical to the structure of the image forming apparatus 100A of FIG. 2, except that the developing belt 41 is not disposed, and the black developing unit 45K, the yellow developing unit 45Y, the magenta developing unit 45M, and the cyan developing unit 45C are disposed at the periphery of the photoconductor drum 10 to directly face the photoconductor drum 10.

Figure 4:
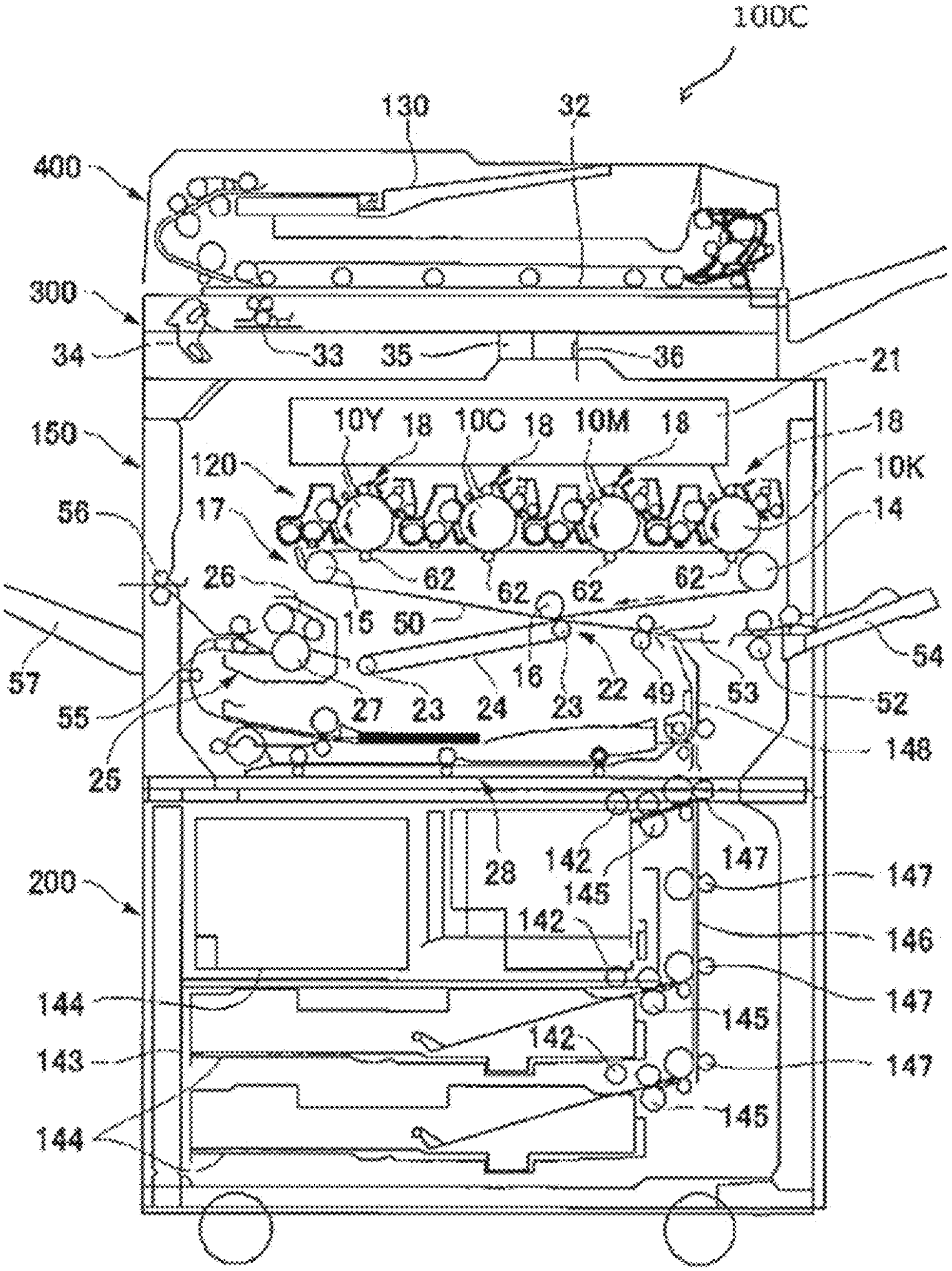
FIG. 4 is a schematic view illustrating yet another example of the image forming apparatus of the present disclosure.

FIG. 4 illustrates yet another example of the image forming apparatus of the present disclosure. The image forming apparatus 100C illustrated in FIG. 4 includes a photocopier main body 150, a paper feeding table 200, a scanner 300, and an automatic document feeder (ADF) 400.

An intermediate transfer member 50, which is an endless belt, is disposed at the central part of the photocopier main body 150.

The intermediate transfer member 50 is supported by support rollers 14, 15, and 16, and is rotatable in the clockwise direction in FIG. 4. An intermediate transfer member cleaning device 17 is disposed closely to the support roller 15. The intermediate transfer member cleaning device 17 is configured to remove the residual toner on the intermediate transfer member 50. A tandem developing device 120 is disposed to face the section of the intermediate transfer member 50 supported by the support rollers 14 and 15. In the tandem developing device 120, four image forming units 18, i.e., a yellow image forming unit, a cyan image forming unit, a magenta image forming unit, and a black image forming unit, are arranged in series along the traveling direction of the intermediate transfer member 50. An exposure device 21 serving as the exposing unit is disposed closely to the tandem developing device 120. A secondary transfer device 22 is disposed at the side of the intermediate transfer member 50 opposite to the side where the tandem developing device 120 is disposed. The secondary transfer device 22 includes a secondary transfer belt 24. The secondary transfer belt 24 is an endless belt and is supported by a pair of rollers 23. Transfer paper borne on and transported by the secondary transfer belt 24 comes into contact with the intermediate transfer member 50. A fixing device serving as the fixing unit is disposed closely to the secondary transfer device 22. The fixing device includes a fixing belt 26, which is an endless belt, and a press roller 27 disposed to press against the fixing belt 26.

The tandem image forming apparatus includes a sheet reverser 28 disposed closely to the secondary transfer device 22 and to the fixing device 25. The sheet reverser 28 is configured to reverse transfer paper to perform image formation on both sides of the transfer paper.

Next, formation of a full-color image (i.e., a color copy) using the tandem developing device 120 will be described. First, a document is set on a document table 130 of the automatic document feeder (ADF) 400. Alternatively, a document is set on contact glass 32 of a scanner 300 by opening the automatic document feeder 400. Once the document is set, the automatic document feeder 400 is closed.

Once a start switch is pressed, if the document is set on the automatic document feeder 400, the document is transported onto the contact glass 32, and then the scanner 300 is driven. If the document is initially set on the contact glass 32, the scanner 300 is immediately driven once the start switch is pressed. Then, a first carriage 33 and a second carriage 34 are driven to scan the document. During the scanning, the first carriage 33 irradiates a surface of the document with light emitted from a light source, and the light reflected from the surface of the document is again reflected by a mirror of the second carriage 34 to pass the light through an imaging forming lens 35. The light is then received by a reading sensor 36 to read the color document (e.g., the color image) to acquire image information of black, yellow, magenta, and cyan.

The image information of each of black, yellow, magenta, and cyan is transmitted to the corresponding image forming unit 18 (the black image forming unit, the yellow image forming unit, the magenta image forming unit, or the cyan image forming unit) of the tandem developing device 120. By means of each image forming unit, a toner image of each color (black, yellow, magenta, or cyan) is formed.

Figure 5:
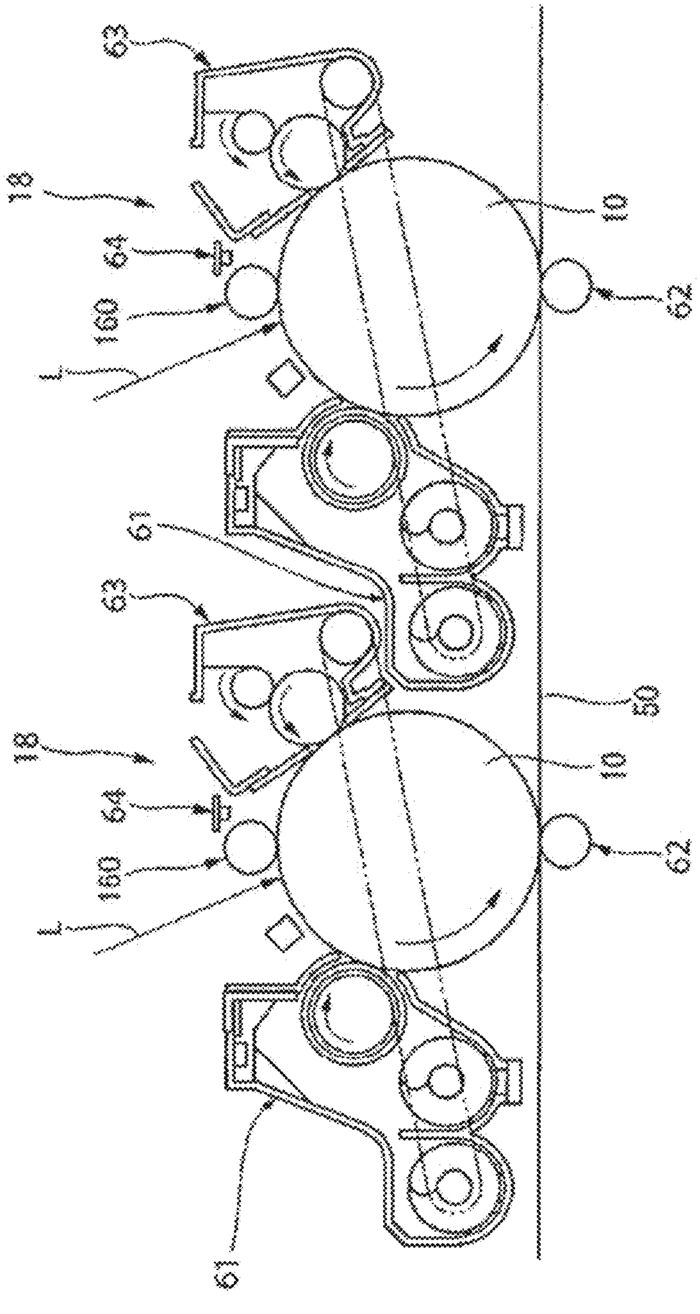
FIG. 5 is an enlarged partial view of FIG. 4.

Specifically, as illustrated in FIG. 5, each image forming unit 18 (the black image forming unit, the yellow image forming unit, the magenta image forming unit, or the cyan image forming unit) of the tandem developing device 120 includes: an electrostatic latent image bearer 10 (a black electrostatic latent image bearer 10K, a yellow electrostatic latent image bearer 10Y, a magenta electrostatic latent image bearer 10M, or a cyan electrostatic latent image bearer 10C); a charging device 160 that is the charging unit configured to uniformly charge a surface of the electrostatic latent image bearer 10; an exposing device configured to expose the electrostatic latent image bearer to light (L in FIG. 5) to correspond to each color image based on the corresponding color image information, to thereby form an electrostatic latent image corresponding to each color image on the electrostatic latent image bearer; a developing device 61 configured to develop the electrostatic latent image with the corresponding color toner (the black toner, the yellow toner, the magenta toner, or the cyan toner), to thereby form a toner image of the corresponding color toner; a transfer charger 62 configured to transfer the toner image to an intermediate transfer member 50; a cleaning device 63; and a charge-eliminating unit 64.

Each image forming unit 18 can form an image of a single color (e.g., a black image, a yellow image, a magenta image, and a cyan image) based on the corresponding color image information. The black image formed on the black electrostatic latent image bearer 10K, the yellow image formed on the yellow electrostatic latent image bearer 10Y, the magenta image formed on the magenta electrostatic latent image bearer 10M, and the cyan image formed on the cyan electrostatic latent image bearer 10C in the above-described manner are sequentially transferred (or primary transferred) onto the intermediate transfer member 50 that is rotatably supported by the support rollers 14, 15, and 16. The black image, the yellow image, the magenta image, and the cyan image are superimposed on the intermediate transfer member 50 to form a composite color image (i.e., a transferred color image).

In the paper feeding table 200, meanwhile, one of paper feeding rollers 142 is selectively driven to rotate to feed sheets (i.e., recording paper) from one of paper feeding cassettes 144 stacked in a paper bank 143. The sheets are separated one by one by a separation roller 145 to feed each sheet into a paper feeding path 146, and the fed sheet is transported by a transport roller 147 to guide the sheet into a paper feeding path 148 inside the photocopier main body 150. The sheet is then caused to collide with a registration roller 49 to stop. Alternatively, a paper feeding roller 142 is driven to rotate to feed sheets (i.e., recording paper) on a manual feed tray 54, and the sheets are separated and fed into a manual paper feeding path 53 one by one with a separation roller 52. Similarly, the fed sheet is caused to collide with a registration roller 49 to stop. The registration roller 49 is typically grounded during use, but the registration roller 49 may be used in the state where bias is applied to the registration roller 49 for removing paper dusts from sheets.

Synchronizing with the timing of the composite color image (i.e., the transferred color image) formed on the intermediate transfer member 50, the registration roller 49 is driven to rotate to feed the sheet (i.e., the recording paper) between the intermediate transfer member 50 and the secondary transfer device 22. The composite color image (i.e., the transferred color image) is then transferred (or secondary transferred) onto the sheet (i.e., the recording paper) by the secondary transfer device 22. In the manner as described above, the color image is transferred and formed onto the sheet (i.e., the recording paper). After transferring the image, the residual toner on the intermediate transfer member 50 is cleaned by the intermediate transfer member cleaning device 17.

The sheet (i.e., the recording paper) on which the color image has been transferred is transported by the secondary transfer device 22 to send the sheet to the fixing device 25. By means of the fixing device 25, heat and pressure are applied to the composite color image (i.e., the transferred color image) to fix the composite color image to the sheet (i.e., the recording paper). Thereafter, the traveling direction of the sheet (i.e., the recording paper) is switched by the switching claw 55 to eject the sheet (i.e., the recording paper) with an ejection roller 56 to stack the sheet (i.e., the recording paper) on the paper ejection tray 57. Alternatively, the traveling direction of the sheet (i.e., the recording paper) is switched by the switching claw 55, and the sheet is flipped by the sheet reverser 28 and is returned to the transfer position. After recording an image also on the back side of the sheet, the sheet is ejected by the ejection roller 56 to stack on the paper ejection tray 57.

EXAMPLES

The present disclosure will be concretely described below by way of Production Examples, Preparation Examples, Examples, and Comparative Examples. The present disclosure should not be construed as being limited to these Production Examples, Preparation Examples, and Examples. In Production Examples, Preparation Examples, Examples, and Comparative Examples, "%" denotes "% by mass" and "part(s)" denotes "part(s) by mass" unless otherwise stated. Moreover, each amount in Examples and Comparative Examples denotes an amount of each starting material on solid basis.

<<Measurement of Amine Value>>

In Production Examples below, an amine value of a ketimine compound was measured according to the measuring method disclosed in JIS K7237.

<<Measurement of Molecular Weight>>

Molecular weights of amorphous polyester resins A, amorphous polyester resins B, and crystalline polyester resins C obtained in Synthesis Examples were measured by means of a gel permeation chromatography (GPC) system under the following analysis conditions.

[Analysis Conditions]

Device: GPC-8220GPC (available from Tosoh Corporation)

Columns: 3 columns connected, TSKgel® SuperHZM-H 15 cm (available from Tosoh Corporation)

Temperature: 40° C.

Detector: refractive index (RI) detector

Solvent: tetrahydrofuran (THF) or chloroform

Feeding rate: 0.35 mL/min

Sample: injecting 100 μL of a 0.15% by mass sample

Pretreatment of sample: An amorphous polyester resin A, amorphous polyester resin B, or crystalline polyester resin C was dissolved in tetrahydrofuran (THF) (including a stabilizer, available from FUJIFILM Wako Pure Chemical Corporation) or chloroform to prepare a solution having a concentration of 0.15% by mass, and the resulting solution was filtered through a 0.2 μm-filter. The resulting filtrate was used as a sample.

To measure a molecular weight of a sample, a molecular weight distribution of the sample was calculated from a relation between logarithmic values and count numbers of calibration curves prepared using several monodisperse polystyrene standard samples. As standard polystyrene samples for preparing calibration curves, Showdex® STANDARD (available from SHOWA DENKO K.K.) Std. Nos. S-6550, S-2330, S-1700, S-740, S-10, S-662, S-2.9, and S-0.6 were used.

<<Measuring Method of Melting Point (Tm) and Glass Transition Temperature (Tg)>>

In Synthesis Examples below, glass transition temperatures (Tg) of amorphous polyester resins A and amorphous polyester resins B, and melting points (Tm) of crystalline polyester resins C were each measured by means of a differential scanning calorimetry (DSC) system (Q-200, a differentia scanning calorimeter, available from TA Instruments Japan Inc.).

First, approximately 5.0 mg of a sample was placed in a sample container formed of aluminum, the sample container was placed on a holder unit, and the holder unit was set in an electric furnace. Subsequently, the measurement sample was heated from −80° C. to 150° C. in a nitrogen atmosphere at a heating rate of 10° C./min (first heating). Then, the measurement sample was cooled from 150° C. down to −80° C. at a cooling rate of 10° C./min, followed by again heating up to 150° C. at a heating rate of 10° C./min (second heating). DSC curves of the first heating and the second heating were each measured by means of a differential scanning calorimeter (Q-200, available from TA Instruments Japan Inc.).

The DSC curve of the second heating was selected from the obtained DSC curves, and a glass transition temperature of the sample from the second heating was determined using the analysis program installed in the Q-200 system.

Moreover, the DSC curve of the second heating was selected from the obtained DSC caves, and an endothermic peak top temperature of the sample from the second heating was determined as a melting point using the analysis program installed in the Q-200 system.

The endothermic peak top temperature from the second heating was determined as a melting point of each sample, and Tg from the second heating was determined as Tg of each sample.

<<Measurement of Volume Average Particle Diameter>>

In Preparation Examples, Examples, and Comparative Examples below, a volume average particle diameter of crystalline polyester resin particles in a crystalline polyester resin C dispersion liquid, a volume average particle diameter of wax particles, and a volume average particle diameter of particles in an emulsified slurry were each measured by means of a particle size distribution analyzer (COULTER MULTISIZER III, available from Beckman Coulter, Inc.).

Specifically, the volume average particle dimeter was measured in the following manner. To 100 mL of an electrolyte solution (ISOTON-II, available from Beckman Coulter, Inc.), 2 mL of a surfactant (sodium dodecylbenzenesulfonate, available from Tokyo Chemical Industry Co., Ltd.) serving as a dispersant was added to prepare a mixed solution. To the mixed solution, 10 mg of a sample (on solid basis) was added to prepare an electrolyte solution in which the sample was suspended. The electrolyte solution, in which the sample was suspended, was dispersed for from approximately 1 minute to approximately 3 minutes by means of COULTER MULTISIZER III using a 100 μm-aperture as an aperture to measure the volume and the number of the sample to calculate a volume distribution and a number distribution. A volume average particle diameter (Dv) of the sample was determined from the obtained distributions.

<<Measurement of Average Circularity>>

In Examples and Comparative Examples below, an average circularity of particles in a dispersion slurry was defined by the following formula, and was measured by means of a flow particle image analyzer (Sysmex FPIA-3000, available from Malvern Panalytical Ltd.).

(Average circularity)=(peripheral length of circle having area identical to area of projected image of particle)/(peripheral length of projected image of particle)

Specifically, 0.1 mL of a surfactant (sodium dodecylbenzenesulfonate, available from Tokyo Chemical Industry Co., Ltd.) serving as a dispersing agent was added to 100 mL of water in a container to prepare a mixture. Solid impurities had been removed from the water prior to the addition of the surfactant. Then, approximately 0.1 g of a sample was added to the mixture to prepare a suspension. Next, the suspension, in which the sample was dispersed, was dispersed for approximately 1 minute by means of an ultrasonic disperser, and the concentration of the dispersion liquid was adjusted to the range of 3,000 particles/μL to 10,000 particles/μL. The resulting dispersion liquid was measured by means of the above-mentioned device to determine an average particle diameter, average circularity, and standard deviation (SD) of circularity.

Note that, a circle equivalent diameter was determined as a particle diameter, an average particle diameter was determined using circle equivalent diameters (number basis), and analysis conditions of the flow particle image analyzer were as follows.

[Analysis Conditions]

Particle diameter range: 0.5 μm≤circle equivalent diameter (number basis)≤200.0 μm Particle shape range: 0.93<circularity≤1.00

(Production Example 1: Synthesis of Ketimine)

A reaction vessel equipped with a stirring rod and a thermometer was charged with 170 parts of isophoronediamine and 75 parts of methyl ethyl ketone, and the resulting mixture was allowed to react for 5 hours at 50° C. to thereby obtain Ketimine Compound 1. Ketimine Compound 1 had an amine value of 418 mgKOH/g.

Production Example A-1: Synthesis of Amorphous Polyester Resin A-1

Synthesis of Prepolymer A-1

A reaction vessel equipped with a cooling tube, a stirrer, and a nitrogen-inlet tube was charged with 3-methyl-1,5-pentanediol, isophthalic acid, plant-derived sebacic acid (available from HOKOKU CORPORATION), and trimethylolpropane together with titanium tetraisopropoxide (1,000 ppm relative to a resin component) in a manner that a molar ratio [OH/COOH] of a hydroxyl group to a carboxyl group was to be 1.1, a diol component was made up of the 3-methyl-1,5-pentanediol (100 mol %), a dicarboxylic acid component was made up of the isophthalic acid (73 mol %) and the sebacic acid (23 mol %), and an amount of the trimethylolpropane was to be 1.5 mol % relative to a total amount of the monomers. The resulting mixture was heated up to 200° C. over the course of approximately 4 hours, followed by heating up to 230° C. for 2 hours, and the reaction was continued until effluent stopped. Thereafter, the reaction product was further allowed to react for 5 hours under the reduced pressure of from 10 mmHg to mmHg to thereby yield Intermediate Polyester A-1.

Next, a reaction vessel equipped with a cooling tube, a stirrer, and a nitrogen-inlet tube was charged with Intermediate Polyester A-1 obtained and isophorone diisocyanate (IPDI) in a manner that a molar ratio (NCO/OH) of an isocyanate group of IPDI to a hydroxyl group of Intermediate Polyester A-1 was to be 2.0. The resulting mixture was diluted with ethyl acetate to prepare a 50% ethyl acetate solution. Thereafter, the 50% ethyl acetate solution was allowed to react for 4 hours at 150° C. to thereby yield Prepolymer A-1.

Synthesis of Amorphous Polyester A-1

Prepolymer A-1 obtained was stirred in a reaction vessel equipped with a heater, a stirrer, and a nitrogen inlet tube, and Ketimine Compound 1 was added to the reaction vessel through dripping in a manner that a molar amount of amine of Ketimine Compound 1 was be equal to a molar amount of isocyanate of Prepolymer A-1. After stirring the resulting mixture for 10 hours at 45° C., an elongation product of the prepolymer was collected. The obtained elongation product of the prepolymer was vacuum dried at 50° C. until an amount of the residual ethyl aetate was reduced to 100 ppm or less to thereby yield Amorphous Polyester Resin A-1. Amorphous Polyester Resin A-1 had Tg of −51° C. and a molecular weight (Mw) of 17,000.

Production Example B-1: Synthesis of Amorphous Polyester Resin B-1

A four-necked flask equipped with a nitrogen-inlet tube, a dehydration tube, a stirrer, and a thermocouple was charged with plant-derived propylene glycol (available from DuPont de Nemours, Inc.), terephthalic acid, and plant-derived succinic acid (available from BioAmber Inc.) in a manner that a diol component was made up of the propylene glycol (100 mol %), a dicarboxylic acid component was made up of the terephthalic acid (86 mol %) and the succinic acid (14 mol %), and a molar ratio (OH/COOH) of a hydroxyl group to a carboxyl group was to be 1.3. The resulting mixture was allowed to react together with titanium tetraisopropoxide (500 ppm relative to a resin component) for 8 hours at 230° C. under ambient pressure, followed by further reacting for 4 hours under the reduced pressure of from 10 mmHg to 15 mmHg. Thereafter, trimellitic acid anhydride was added to the reaction vessel in a manner that an amount of the trimellitic acid anhydride was to be 1 mol % relative to a total amount of the resin component. The resulting mixture was allowed to react for 4 hours at 180° C. under ambient pressure to thereby yield Amorphous Polyester Resin B-1.

Amorphous Polyester Resin B-1 had Tg of 57° C. and a molecular weight (Mw) of 10,000.

Production Example B-2: Synthesis of Amorphous Polyester Resin B-2

A four-necked flask equipped with a nitrogen-inlet tube, a dehydration tube, a stirrer, and a thermocouple was charged with a bisphenol A ethylene oxide (2 mol) adduct, a bisphenol A propylene oxide (2 mol) adduct, terephthalic acid, and adipic acid in a manner that a diol component was made up of the bisphenol A propylene oxide (2 mol) adduct (60 mol %) and the bisphenol A ethylene oxide (2 mol) adduct (40 mol %), a carboxylic acid component was made up of the terephthalic acid (97 mol %) and the adipic acid (3 mol %), and a molar ratio [OH/COOH] of a hydroxyl group to a carboxyl group was to be 1.3. The resulting mixture was allowed to react together with titanium tetraisopropoxide (500 ppm relative to a resin component) for 8 hours at 230° C. under ambient pressure, followed by further reacting for 4 hours under the reduced pressure of from 10 mmHg to 15 mmHg. Thereafter, trimellitic acid anhydride was added to the reaction vessel in a manner that an amount of the trimellitic acid anhydride was to be 1 mol % relative to a total amount of the resin component. The resulting mixture was allowed to react for 4 hours at 180° C. under ambient pressure to thereby yield Amorphous Polyester Resin B-2. Amorphous Polyester Resin B-2 had Tg of 65° C. and a molecular weight (Mw) of 9,000.

Amorphous Polyester Resin A-1 obtained in Production Example A-1 and Amorphous Polyester Resins B-1 and B-2 obtained in Production Examples B-1 and B-2 are summarized in Table 1 below.

TABLE 1

| | | Diol | Dicarboxylic acid | Tg [° C.] | Molecular weight [Mw] |
|---|---|---|---|---|---|
| Amorphous Polyester Resin A | A-1 | 3-methyl-1,5-pentanediol (100 mol %) | isophthalic acid (73 mol %)/ plant-derived sebacic acid (23 mol %) | −51 | 17,000 |
| Amorphous Polyester Resin B | B-1 | plant-derived propylene glycol | terephthalic acid (86 mol %)/ plant-derived succinic acid (14 mol %) | 57 | 10,000 |
| | B-2 | bisphenol A propylene oxide (2 mol) adduct (60 mol %)/ bisphenol A ethylene oxide (2 mol) adduct (40 mol %) | terephthalic acid (97 mol %)/ adipic acid (3 mol %) | 65 | 9,000 |

Production Example C-1: Synthesis of Crystalline Polyester Resin C-1

A 5 L four-necked flask equipped with a nitrogen-inlet tube, a dehydration tube, a stirrer, and a thermocouple was charged with plant-derived sebacic acid and 1,6-hexanediol in a manner that a molar ratio (OH/COOH) of a hydroxyl group to a carboxyl group was to be 0.9. The resulting mixture was allowed to react together with titanium tetraisopropoxide (500 ppm relative to a resin component) for 10 hours at 180° C., and the mixture was heated at 200° C. and was allowed to react for 3 hours, followed by further reacting for 2 hours at 8.3 kPa to thereby yield Crystalline Polyester Resin C-1. Crystalline Polyester Resin C-1 had a melting point of 67° C. and a molecular weight (Mw) of 25,000.

Preparation Example 1-1: Preparation of Crystalline Polyester Resin Dispersion Liquid 1

A separable flask was charged with 350 parts of Crystalline Polyester Resin C-1, 210 parts of methyl ethyl ketone, and 61.8 parts of isopropyl alcohol, and the resulting mixture was adequately mixed and dissolved at 50° C., followed by adding 16.24 parts of a 10% ammonia aqueous solution through dripping. To the resulting mixture, ion-exchanged water was added through dripping by means of a feeding pump at a feeding rate of 8 g/min with stirring at a heating temperature of 65° C. When the mixture was homogeneously clouded in white, the feeding rate was increased to 12 g/min, and dripping of ion-exchanged water was stopped when a total amount of the fluid mixture reached 1,400 parts. Thereafter, the solvent was removed from the mixture under the reduced pressure, to thereby yield Crystalline Polyester Resin Dispersion Liquid 1. A volume average particle diameter of the crystalline polyester resin particles in Crystalline Polyester Resin Dispersion Liquid 1 obtained was 150 nm, and Crystalline Polyester Resin Dispersion Liquid 1 had a solid content (resin particle content) of 30%.

Preparation Example 2-1: Preparation of Wax Dispersion Liquid W-1

To 720 parts of ion-exchanged water, 180 parts of ester wax (WE-11, synthesized wax from plant-derived monomers, available from NOF CORPORATION, melting point: 67° C.), and 17 parts of an anionic surfactant (NEOGEN® SC, sodium dodecylbenzenesulfonate, available from DKS Co., Ltd.) serving as a surfactant were added. The resulting mixture was dispersed by means of a homogenizer with heating at 90° C., to thereby yield Wax Dispersion Liquid W-1. A volume average particle diameter of wax particles in Wax Dispersion Liquid W-1 obtained was 300 nm, and Wax Dispersion Liquid W-1 had a solid content (wax particle content) of 25%.

(Preparation Example 3-1: Preparation of Master Batch (MB)-1)

To 1,200 parts of water, 500 parts of carbon black (Printex® 35, available from Degussa, DBP oil absorption: 42 mL/100 mg, pH: 9.5) and 500 parts of Amorphous Polyester Resin B-1 were added, and the resulting mixture was mixed by means of HENSCHEL MIXER (available from NIPPON COKE & ENGINEERING CO., LTD.), followed by kneading the mixture for 30 minutes at 150° C. by means of a two-roll kneader. The resulting kneaded product was rolled and cooled, followed by pulverizing by means of a pulverizer to thereby prepare Master Batch MB-1.

Example 1

Preparation of Oil Phase

A vessel was charged with 80 parts of Amorphous Polyester Resin A-1, 50 parts of Wax Dispersion Liquid W-1 (on solid basis), 450 parts of Amorphous Polyester Resin B-1, 150 parts of recycled PET resin flakes (P-1), and 100 parts of MB-1, and the resulting mixture was mixed by means of a TK Homomixer (available from PRIMIX Corporation) for 60 minutes at 5,000 rpm, to thereby prepare Oil Phase 1.

Preparation of Aqueous Phase

Water (990 parts), 20 parts of sodium dodecyl sulfate, and 90 parts of ethyl acetate were mixed and stirred to prepare a milky white liquid, which was provided as Aqueous Phase 1.

<Phase Inversion Emulsification>

While stirring 700 parts of Oil Phase 1 at a rotational speed of 8,000 rpm by means of a TK Homomixer, 20 parts of a 28% ammonia solution was added. The resulting mixture was mixed for 10 minutes, followed by gradually adding 1,200 parts of Aqueous Phase 1 by dripping, to thereby prepare Emulsified Slurry 1. Emulsified Slurry 1 had a volume average particle diameter of 560 nm.

<Removal of Solvent>

A vessel equipped with a stirrer and a thermometer was charged with Emulsified Slurry 1. The solvent was removed from Emulsified Slurry 1 for 180 minutes at 30° C. to thereby prepare Desolventized Slurry 1.

<Coagulating>

To Desolventized Slurry 1, 70 parts of Crystalline Polyester Resin Dispersion Liquid 1 (on solid basis) was added. To the resulting mixture, 100 parts of a 3% magnesium chloride solution was further added by dripping. The resulting mixture was stirred for 5 minutes, followed by heating to 60° C. When diameters of the particles therein reached 5.0 μm, 50 parts of sodium chloride was added to complete the process of the coagulating, to thereby prepare Coagulated Slurry 1.

Preparation of Particle Dispersion Liquid

A vessel was charged with 100 parts of Amorphous Polyester Resin B-2 and 300 parts of methyl ethyl ketone, and the resulting mixture was mixed and dissolved by means of a TK Homomixer (available from PRIMIX Corporation) to thereby prepare Resin Solution 1.

Separately, 990 parts of water, 20 parts of sodium dodecyl sulfate, and 90 parts of methyl ethyl ketone were mixed and stirred, to thereby yield a milky white liquid, which was provided as Aqueous Phase 2.

While stirring Resin Solution 1 by means of a TK Homomixer at 8,000 rpm, 20 parts of a 20% sodium hydroxide aqueous solution was added. After mixing the resulting mixture for 10 minutes, 1,200 parts of Aqueous Phase 2 was gradually added by dripping, to thereby yield Particle Dispersion Slurry 1. A vessel equipped with a stirrer and a thermometer was charged with Particle Dispersion Slurry 1, the solvent was removed for 180 minutes at 30° C. to thereby yield particle Dispersion Liquid 1. A volume average particle diameter of the particles in Particle Dispersion Liquid 1 obtained was 75 nm.

Formation of Shells and Fusing

While stirring Coagulated Slurry 1, 200 parts of Particle Dispersion Liquid 1 (on solid basis) was added, followed by adding 100 parts of a 3% magnesium chloride solution through dripping. The resulting mixture was stirred for 5 minutes, followed by heating at 70° C. When the particles therein reached a desired average circularity, i.e., 0.957, 50 parts of sodium chloride was added, followed by cooling, to thereby yield Dispersion Slurry 1.

<Washing and Drying>

After subjecting 100 parts of Dispersion Slurry 1 to vacuum filtration, the resulting filtration cake was subjected to a series of the following processes (1) to (4) twice to thereby prepare Filtration Cake 1.

(1): To the filtration cake, 100 parts of ion-exchanged water was added, and the resulting mixture was mixed by means of a TK Homomixer (for 10 minutes at a rotational speed of 12,000 rpm), followed by performing filtration.

(2): To the filtration cake of (1), 100 parts of a 10% sodium hydroxide aqueous solution was added, and the resulting mixture was mixed by means of a TK Homomixer (for 30 minutes at a rotational rate of 12,000 rpm), followed by performing vacuum filtration.

(3): To the filtration cake of (2), 100 parts of 10% hydrochloric acid was added, and the resulting mixture was mixed by means of a TK Homomixer (for 10 minutes at a rotational speed of 12,000 rpm), followed by performing filtration.

(4): To the filtration cake of (3), 300 parts of ion-exchanged water was added, and the resulting mixture was mixed by mean of a TK Homomixer (for 10 minutes at a rotational speed of 12,000 rpm), followed by performing filtration.

Filtration Cake 1 was dried by mean of an air circulation dryer for 48 hours a 45° C. The resulting dried product was sieved through a sieve having a mesh-size of 75 μm to thereby yield Resin Base Particles 1.

<External Additive Treatment>

To 100 parts of Resin Base Particles 1, 2.0 parts of hydrophobic silica (HDK® H2000, available from Clariant) was added as an external additive. The resulting mixture was mixed by means of HENSCHEL MIXER. The resulting mixture was passed through a sieve with a 500-mesh to thereby yield Toner 1.

Example 2

Toner 2 of Example 2 was produced in the same manner as in Example 1, except that the amount (parts) of the PET resin P-1 used in <Preparation of oil phase> and the amount (parts) of Amorphous Polyester Resin B-2 used in <Preparation of particle dispersion liquid> (i.e., the amount (parts) of Amorphous Polyester Resin B-2 in Particle Dispersion Liquid 1 used in <Formation of shells and fusing>) were changed as presented in Table 2 below.

Example 3

Toner 3 of Example 3 was obtained in the same manner as in Example 1, except that the amounts (parts) of Amorphous Polyester Resin B-1 and the PET resin P-1 used in <Preparation of oil phase> were changed as presented in Table 2 below, respectively.

Example 4

Toner 4 of Example 4 was obtained in the same manner as in Example 1, except that the amounts (parts) of Amorphous Polyester Resin B-1 and the PET resin P-1 used in <Preparation of oil phase>, and the amount (parts) of Amorphous Polyester Resin B-2 used in <Preparation of particle dispersion liquid> (i.e., the amount (parts) of Amorphous Polyester Resin B-2 in Particle Dispersion Liquid 1 used in <Formation of shells and fusing>) were changed as presented in Table 2 below, respectively.

Example 5

Toner 5 of Example 5 was obtained in the same manner as in Example 1, except that the amount (parts) of Amorphous Polyester Resin B-1 was changed as presented in Table 2 below, 150 parts of the PET resin P-1 was changed to 50 parts of recycled PBT resin flakes P-2, and the amount (parts) of Amorphous Polyester Resin B-2 used in <Preparation of particle dispersion liquid> (i.e., the amount (parts) of Amorphous Polyester Resin B-2 in Particle Dispersion Liquid 1 used in <Formation of shells and fusing>) was changed as presented in Table 2 below.

Comparative Example 1

Toner 6 of Comparative Example 1 was obtained in the same manner as in Example 1, except that, the amount (parts) of Amorphous Polyester Resin B-1 used in <Preparation of oil phase> was changed as presented in Table 2 below, and the PET resin P-1 was not added in <Preparation of oil phase>.

Comparative Example 2

Toner 7 of Comparative Example 2 was obtained in the same manner as in Example 1, except that the amounts (parts) of Amorphous Polyester Resin B-1 and the PET resin P-1 used in <Preparation of oil phase> and the amount (parts) of Amorphous Polyester Resin B-2 used in <Preparation of particle dispersion liquid> (i.e., the amount (parts) of Amorphous Polyester Resin B-2 in Particle Dispersion Liquid 1 used in <Formation of shells and fusing>) were changed as presented in Table 2 below, respectively.

Comparative Example 3

Toner 8 of Comparative Example 3 was obtained in the same manner as in Example 1, except that the amount (parts) of Amorphous Polyester Resin B-1 used in <Preparation of oil phase> was changed as presented in Table 2 below, and Particle Dispersion Liquid 1 was not added in <Formation of shells and fusing>.

Comparative Example 4

Toner 9 of Comparative Example 4 was obtained in the same manner as in Example 1, except that the amount (parts) of Amorphous Polyester Resin B-1 used in <Preparation of oil phase> was changed as presented in Table 2 below, the PET resin P-1 was not added in <Preparation of oil phase>, and Particle Dispersion Liquid 1 was not added in <Formation of shells and fusing>.

Comparative Example 5

Toner 10 of Comparative Example 5 was obtained in the same manner as in Example 1, except that, in <Preparation of oil phase>, 450 parts of Amorphous Polyester Resin B-1 was replaced with 700 parts of Amorphous Polyester Resin B-2, and the PET resin P-1 was not added; and Particle Dispersion Liquid 1 was not added in <Formation of shells and fusing>.

Comparative Example 6

Toner 11 of Comparative Example 6 was obtained in the same manner as in Example 1, except that the amounts (parts) of Amorphous Polyester Resin B-1 and the PET resin P-1 used in <Preparation of oil phase> were changed as presented in Table 2 below, respectively.

TABLE 2

| | | Amount (solid content) [parts by mass] | | | | | | | | |
|---|---|---|---|---|---|---|---|---|---|---|
| | | Oil phase | | | | | | | Coagulating | Formation of shell and fusing |
| | | Amorphous Polyester Resin B | | PET | PBT | Amorphous Polyester Resin A | Master batch | Wax | Crystalline Polyester Resin C | Amorphous Polyester Resin B |
| | | B-1 | B-2 | P-1 | P-2 | A-1 | MB-1 | W-1 | C-1 | B-2 |
| Ex. 1 | Toner 1 | 450 | 0 | 150 | 0 | 80 | 100 | 50 | 70 | 100 |
| Ex. 2 | Toner 2 | 450 | 0 | 100 | 0 | 80 | 100 | 50 | 70 | 150 |
| Ex. 3 | Toner 3 | 550 | 0 | 50 | 0 | 80 | 100 | 50 | 70 | 100 |
| Ex. 4 | Toner 4 | 500 | 0 | 50 | 0 | 80 | 100 | 50 | 70 | 150 |
| Ex. 5 | Toner 5 | 500 | 0 | 0 | 50 | 80 | 100 | 50 | 70 | 150 |
| Comp. Ex. 1 | Toner 6 | 600 | 0 | 0 | 0 | 80 | 100 | 50 | 70 | 100 |
| Comp. Ex. 2 | Toner 7 | 300 | 0 | 100 | 0 | 80 | 100 | 50 | 70 | 300 |
| Comp. Ex. 3 | Toner 8 | 550 | 0 | 150 | 0 | 80 | 100 | 50 | 70 | 0 |
| Comp. Ex. 4 | Toner 9 | 700 | 0 | 0 | 0 | 80 | 100 | 50 | 70 | 0 |
| Comp. Ex. 5 | Toner 10 | 0 | 700 | 0 | 0 | 80 | 100 | 50 | 70 | 0 |
| Comp. Ex. 6 | Toner 11 | 250 | 0 | 350 | 0 | 80 | 100 | 50 | 70 | 100 |

Each of the toners obtained in Examples 1 to 5 and Comparative Examples 1 to 6 was subjected to identification of a core-shell structure, measurement of an average thickness of a shell layer, a composition analysis of a resin of the shell layer, measurement of radiocarbon $^{14}C$ content indicating a biomass degree, and calculation of an environmentally friendly resin ratio (% by mass) in the following manner. The results are presented in Tables 3-1-1 and 3-1-2 below. Moreover, an amount A (% by mass) of a biomass-derived component of the biomass-derived resin and an amount B (% by mass) of the PET or PBT in each of the toners obtained in Examples 1 to 5 and Comparative Examples 1 to 6 are also presented in Table 3-1-1.

<<Identification of Core-Shell Structure and Measurement of Average Thickness of Shell Layer>>

Each of the obtained toner was embedded in an epoxy-based resin (Devcon S-31, available from ITW PP&F JAPAN Co., LTD.), and the epoxy-based resin was cured. The cured resin was cut with a knife to expose cross-sections of the toner particles, and the resulting resin was sliced into a thickness of 80 nm by means of an ultramicrotome (Leica ULTRACUT UCT, available from Leica Microsystems, using a diamond knife) to prepare an ultra-thin cut piece of the toner. The prepared ultra-thin cut piece of the toner was exposed to a ruthenium tetroxide ($RuO_4$) gas to dye the toner to identify shells and cores. Then, the cross-sectional image of the toner particles was observed under a transmission electron microscope (H-7000, available from Hitachi High-Tech Corporation) at acceleration voltage of 100 kV and magnification of 15,000×. As the toner particles to be observed, particles were randomly selected and images of the selected 10 particles were captured. As one example of the TEM image, a cross-sectional image of the toner of Example 1 is depicted in FIG. 6.

An average thickness of the shell layer was calculated using image processing software (Image-J) in the following manner.

(1) A scale was traced using a "Straight Line" function to draw a straight line. An actual length and unit of the straight line were set using a "Set Scale" function on an "Analyze" window.

(2) A periphery of one resin particle was traced with the "Freehand-sections" function on a cross-sectional image of the one resin particle to set "Region 1."

(3) A periphery of a region of the cross-sectional image of the one resin particle excluding the shell layer (i.e., a boundary between the shell layer and the core layer) was traced with the "Freehand-sections" function to set "Region 2."

(4) A center of gravity of the "Region 1" was determined with an "Analyze" function.

(5) Using the originally developed plug-in, straight lines were drawn from coordinates towards the center of gravity of the resin particle determined in (4). The coordinates were created by evenly dividing the line tracing the periphery of the "Region 1", i.e., the periphery of the resin particle in (2), into 100.

(6) On each of the 100 straight lines drawn in (5), a length obtained by subtracting the length of the straight line passing through "Region 2" from the length of the straight line passing through "Region 1" was calculated using the straight line created by tracing the scale in (1). An average length of the calculated lengths from the 100 straight lines was determined as a thickness of the shell layer of the resin particle.

(7) The operations of (2) to (6) were performed on resin particles, and an average value of the thicknesses of the shell layers of the 10 resin particles was calculated. The calculated average value was determined as an average thickness of the shell layer of the toner.

The results are presented in Table 3-1-1. In Table 3-1-1, the result that the core-shell structure was identified was represented as "good," and the result that the core-shell structure was not identified was represented as "not good."

<<Analysis of Resin Composition of Shell Layer>>

Each of the obtained toners was embedded in an epoxy-based resin (Devcon S-31, available from ITW PP&F JAPAN Co., LTD.), and the epoxy-based resin was cured. The cured resin was cut with a knife to expose cross-sections of the resin particles, and the resulting resin was sliced into a thickness of 50 nm by means of an ultramicrotome (Leica ULTRACUT UCT, available from Leica Microsystems, using a diamond knife) to prepare an ultra-thin cut piece of the toner. The prepared ultra-thin cut piece of the resin particles was collected on a substrate (ZnS), and the shell layer was measured by means of a nanoscale infrared spectrometer (nanoIR2, available from Anasys Instruments Corp.) according to AFM-IR. A measuring range was set to from 1,900 $cm^{-1}$ through 910 $cm^{-1}$, and resolution was set to 2 $cm^{-1}$. From the obtained an AFM-IR absorption spectrum, a chemical structure of the shell layer was determined.

In Table 3-1-1 below, the result that the shell layer was free from a biomass-derived resin was represented as "good," the result that the shell layer included a biomass-derived resin was not represented as "not good," and the result that the toner did not have a core-shell structure was represented as "NA."

<<Measuring Method of Radiocarbon $^{14}C$ Content>>

A radiocarbon $^{14}C$ content of each toner was measured by radiocarbon dating.

The toner was combusted, and carbon dioxide ($CO_2$) of the combusted toner was reduced to obtain C (graphite). A $^{14}C$ content of the C (graphite) was measured by means of an accelerator mass spectrometer (AMS) (available from Beta Analytic).

As a standard, an oxalic acid standard (HOxII, available from NIST) was used.

<<Calculation of Environmentally Friendly Resin Ratio (% by Mass)>>

In order to calculate an environmentally friendly resin ratio, an amount (A) of a biomass-derived component of a biomass-derived resin relative to a total mass of each of the toner, i.e., a biomass degree, was calculated according to Formula (1) below. Moreover, an amount (B) of PET or PBT was calculated from the blended amounts of the constituent components.

Next, an environmentally friendly resin ratio was calculated according to Formula (2) below.

$$\text{Biomass degree (\%)} = {}^{14}\text{C content}(pMC)/107.5\times 100 \quad \text{[Formula (1)]}$$

$$\text{Environmentally friendly resin ratio (\% by mass)} = \text{amount } (A) \text{ of biomass-derived component of biomass-derived resin} + \text{amount } (B) \text{ of } PET \text{ or } PBT \quad \text{[Formula (2)]}$$

Environmental friendliness, low-temperature fixability, and filming resistance of each of the toners obtained in Examples 1 to 5 and Comparative Examples 1 to 6 were evaluated in the following manner. The results are presented in Table 3-2.

<Evaluation Methods>

<<Environmental Friendliness>>

"Environmental friendliness" of each of the toners obtained in Examples 1 to 5 and Comparative Examples 1 to 6 was evaluated from the environmentally friendly resin ratio in the toner based on the following evaluation criteria.

—Evaluation criteria of "environmental friendliness"—

Good: The environmentally friendly resin ratio was 35% by mass or greater.

Fair: The environmentally friendly resin ratio was 10% by mass or greater but less than 35% by mass.

Not good: The environmentally friendly resin ratio was less than 10% by mass.

<<Low-Temperature Fixability>>

A carrier used for a printer (imagio MP C5503, available from Ricoh Company Limited) and each of the toners obtained in Examples 1 to 5 and Comparative Examples 1 to 6 were mixed to prepare a developer so that a concentration of the toner was 5% by mass.

After charging the unit of the printer (imagio MP C5503, available from Ricoh Company Limited) with the developer, a rectangular solid image in the size of 2 cm×15 cm was formed on a PPC sheet (Type 6000<70W>, A4, Long grain, available from Ricoh Company Limited) in a manner that a toner deposition amount was to be 0.40 mg/cm$^2$. During the printing, a surface temperature of a fixing roller was varied to observe whether cold offset would occur, and a cold-offset temperature (i.e., the minimum fixing temperature) was determined. The cold offset is a phenomenon where a developed solid image is fixed in a position other than a predetermined position. "Low-temperature fixability" was evaluated according to the following evaluation criteria.

—Evaluation Criteria of "Low-Temperature Fixability"—

Good: The cold offset temperature was lower than 110° C.

Fair: The cold offset temperature was 110° C. or higher but lower than 125° C.

Not good: The cold offset temperature was 125° C. or higher.

<<Filming Resistance>>

A carrier used for a printer (imagio MP C5503, available from Ricoh Company Limited) and each of the toners obtained in Examples 1 to 5 and Comparative Examples 1 to 6 were mixed to prepare a developer so that a concentration of the toner was 5% by mass.

After charging the unit of the printer (imagio MP C5503, available from Ricoh Company Limited) with the developer, a printing pattern having a printing ratio of 2% was printed on PPC sheets (type 6000<70W>, A4, long grain, available from Ricoh Company Limited) in high-temperature and high-humidity conditions (temperature: 27° C., and humidity: 80%) with 1 job per sheet. The printing was performed with the photoconductor being inspected each time after printing 10,000 sheets, and "filming resistance" was evaluated based on the following evaluation criteria.

—Evaluation Criteria "Filming Resistance"—

Good: Filming on the photoconductor did not occur after printing 200,000 sheets.

Fair: Filming on the photoconductor occurred after printing between 80,000 sheets and 200,000 sheets.

Not good: Filming on the photoconductor occurred before printing 70,000th sheet.

TABLE 3-1-1

| | | Amount (A) of biomass-derived component of biomass-derived resin [% by mass] | Amount (B) of PET or PBT [% by mass] | Core-shell structure | Biomass-derived resin in shell layer |
|---|---|---|---|---|---|
| Ex. 1 | Toner 1 | 29 | 15 | Good | Good |
| Ex. 2 | Toner 2 | 29 | 10 | Good | Good |
| Ex. 3 | Toner 3 | 33 | 5 | Good | Good |
| Ex. 4 | Toner 4 | 31 | 5 | Good | Good |
| Ex. 5 | Toner 5 | 31 | 5 | Good | Good |
| Comp. Ex. 1 | Toner 6 | 35 | 0 | Good | Good |
| Comp. Ex. 2 | Toner 7 | 23 | 10 | Good | Good |
| Comp. Ex. 3 | Toner 8 | 33 | 15 | Not good | NA |
| Comp. Ex. 4 | Toner 9 | 39 | 0 | Not good | NA |
| Comp. Ex. 5 | Toner 10 | 11 | 0 | Not good | NA |
| Comp. Ex. 6 | Toner 11 | 21 | 35 | Good | Good |

TABLE 3-1-2

| | | Average thickness of shell layer [nm] | $^{14}C$ content [pMC] | Environmentally friendly resin ratio (A + B) [% by mass] |
|---|---|---|---|---|
| Ex. 1 | Toner 1 | 140 | 30.8 | 44 |
| Ex. 2 | Toner 2 | 236 | 30.8 | 39 |
| Ex. 3 | Toner 3 | 138 | 35.1 | 38 |
| Ex. 4 | Toner 4 | 252 | 32.9 | 36 |
| Ex. 5 | Toner 5 | 248 | 32.9 | 36 |
| Comp. Ex. 1 | Toner 6 | 134 | 37.2 | 35 |
| Comp. Ex. 2 | Toner 7 | 552 | 24.3 | 33 |
| Comp. Ex. 3 | Toner 8 | 0 | 35.1 | 48 |
| Comp. Ex. 4 | Toner 9 | 0 | 41.5 | 39 |
| Comp. Ex. 5 | Toner 10 | 0 | 11.4 | 11 |
| Comp. Ex. 6 | Toner 11 | 158 | 22.2 | 56 |

TABLE 3-2

| | | Evaluation results | | |
|---|---|---|---|---|
| | | Environmental friendliness | Low-temperature fixability | Filming resistance |
| Ex. 1 | Toner 1 | Good | Good | Fair |
| Ex. 2 | Toner 2 | Good | Good | Good |
| Ex. 3 | Toner 3 | Good | Good | Fair |
| Ex. 4 | Toner 4 | Fair | Good | Fair |
| Ex. 5 | Toner 5 | Fair | Good | Fair |
| Comp. Ex. 1 | Toner 6 | Fair | Fair | Not good |
| Comp. Ex. 2 | Toner 7 | Fair | Not good | Good |
| Comp. Ex. 3 | Toner 8 | Good | Fair | Not good |
| Comp. Ex. 4 | Toner 9 | Good | Fair | Not good |
| Comp. Ex. 5 | Toner 10 | Not good | Fair | Not good |
| Comp. Ex. 6 | Toner 11 | Good | Not good | Good |

For example, embodiments of the present disclosure are as follows.

<1> Resin particles, each including:

a binder resin, wherein the binder resin includes a biomass-derived resin, and polyethylene terephthalate or polybutylene terephthalate, an amount A of a biomass-derived component of the biomass-derived resin and an amount B of the polyethylene terephthalate or the polybutylene terephthalate satisfy A>B, each of the resin particles has a core-shell structure including a shell layer and a core layer, and an average thickness of the shell layer is from 100 nm to 500 nm.

<2> The resin particles according to <1>, wherein the shell layer includes a binder resin free from the biomass-derived resin.

<3> The resin particles according to <1> or <2>, wherein the average thickness of the shell layer is from 200 nm to 300 nm.

<4> The resin particles according to any one of <1> to <3>, wherein a sum [A+B] of the amount A of the biomass-derived component of the biomass-derived resin and the amount B of the polyethylene terephthalate or the polybutylene terephthalate relative to a total mass of the resin particles is 35% by mass or greater.

<5> The resin particles according to <4>, wherein the amount A of the biomass-derived component of the biomass-derived resin relative to the total mass of the resin particles is from 25% by mass to 35% by mass.

<6> The resin particles according to any one of <1> to <5>, wherein the resin particles have a radiocarbon $^{14}C$ content of 10.8 pMC or greater.

<7> A method of producing resin particles, including:

dissolving or dispersing a binder resin including a biomass-derived resin and polyethylene terephthalate or polybutylene terephthalate in an organic solvent to prepare an oil phase, where an amount A of a biomass-derived component of the biomass-derived resin and an amount B of the polyethylene terephthalate or the polybutylene terephthalate satisfy A>B;

adding an aqueous phase to the oil phase to cause phase inversion emulsification from a water-in-oil dispersion liquid to an oil-in-water dispersion liquid in which particles of the oil phase are dispersed in the aqueous phase;

coagulating the particles in the oil-in-water dispersion liquid to prepare cohesive particles; and forming a shell layer on each of the cohesive particles to form the resin particles according to any one of <1> to <6> each having a core-shell structure, where the core-shell structure includes the shell layer and a core layer, and an average thickness of the shell layer is from 100 nm to 500 nm.

<8> A toner including:

the resin particles according to any one of <1> to <6>; and one or more external additives.

<9> A developer including:

a carrier; and the toner according to <8>.

<10> A toner storage unit including:

the toner according to <8>; and a unit in which the toner is stored.

<11> An image forming apparatus, including:

an electrostatic latent image bearer;

an electrostatic latent image forming unit configured to form an electrostatic latent image on the electrostatic latent image bearer; and a developing unit that stores the toner according to <8> and is configured to develop the electrostatic latent image formed on the electrostatic latent image bearer with the toner to form a visible image.

<12> An image forming method including:

forming an electrostatic latent image on an electrostatic latent image bearer; and developing the electrostatic latent image formed on the electrostatic latent image bearer with a toner to for a visible image, wherein the toner is the toner according to <8>.

The resin particles according to any one of <1> to <6>, the method of producing resin particles according to <7>, the toner according to <8>, the developer according to <9>, the toner storage unit according to <10>, the image forming apparatus according to <11>, and the image forming method according to <12> solve the above-described various problems existing in the art, and can achieve the object of the present disclosure.

What is claimed is:

1. Resin particles, each comprising:

a binder resin, wherein the binder resin includes a biomass-derived resin, and polyethylene terephthalate or polybutylene terephthalate, an amount A of a biomass-derived component of the biomass-derived resin and an amount B of the polyethylene terephthalate or the polybutylene terephthalate satisfy A>B, each of the resin particles has a core-shell structure including a shell layer and a core layer, an average thickness of the shell layer is from 100 nm to 500 nm;

wherein the shell layer comprises an amorphous polyester resin; and wherein the biomass-derived resin comprises the amorphous polyester resin, and an acid component of the amorphous polyester resin comprises plant-derived sebacic acid.

2. The resin particles according to claim 1, wherein the shell layer includes a binder resin free from the biomass-derived resin.

3. The resin particles according to claim 1, wherein the average thickness of the shell layer is from 200 nm to 300 nm.

4. The resin particles according to claim 1, wherein a sum [A+B] of the amount A of the biomass-derived component of the biomass-derived resin and the amount B of the polyethylene terephthalate or the polybutylene terephthalate relative to a total mass of the resin particles is 35% by mass or greater.

5. The resin particles according to claim 4, wherein the amount A of the biomass-derived component of the biomass-derived resin relative to the total mass of the resin particles is from 25% by mass to 35% by mass.

6. The resin particles according to claim 1, wherein the resin particles have a radiocarbon $^{14}C$ content of 10.8 pMC or greater.

7. A method of producing resin particles, comprising:

dissolving or dispersing a binder resin including a biomass-derived resin and polyethylene terephthalate or polybutylene terephthalate in an organic solvent to prepare an oil phase, where an amount A of a biomass-derived component of the biomass-derived resin and an amount B of the polyethylene terephthalate or the polybutylene terephthalate satisfy A>B;

adding an aqueous phase to the oil phase to cause phase inversion emulsification from a water-in-oil dispersion liquid to an oil-in-water dispersion liquid in which particles of the oil phase are dispersed in the aqueous phase;

coagulating the particles in the oil-in-water dispersion liquid to prepare cohesive particles; and forming a shell layer on each of the cohesive particles to form resin particles according to claim 1 each having a core-shell structure, where the core-shell structure includes the shell layer and a core layer, and an average thickness of the shell layer is from 100 nm to 500 nm.

8. A toner comprising:

the resin particles according to claim 1; and one or more external additives.

9. A toner storage unit comprising:

the toner according to claim 8; and a unit in which the toner is stored.

10. An image forming apparatus, comprising:

an electrostatic latent image bearer;

an electrostatic latent image forming unit configured to form an electrostatic latent image on the electrostatic latent image bearer; and a developing unit that stores the toner according to claim 8 and is configured to develop the electrostatic latent image formed on the electrostatic latent image bearer with the toner to form a visible image.

11. The resin particles according to claim 1, wherein the amorphous polyester resin is synthesized from an alcohol component and a carboxylic acid component, and wherein the alcohol component contains an alkylene oxide adduct of bisphenol A.

* * * * *